US005908396A

United States Patent [19]
Hayakawa et al.

[11] Patent Number: 5,908,396
[45] Date of Patent: Jun. 1, 1999

[54] PITCH MEASUREMENT DEVICE, ELECTRONIC INSTRUMENT, AND PITCH MEASUREMENT METHOD

[75] Inventors: Motomu Hayakawa, Suwa; Chiaki Nakamura, Chiba, both of Japan

[73] Assignees: Seiko Epson Corporation, Tokyo, Japan; Seiko Instruments, Inc., Chiba, Japan

[21] Appl. No.: 08/849,872

[22] PCT Filed: Oct. 18, 1996

[86] PCT No.: PCT/JP96/03032

§ 371 Date: Aug. 1, 1997

§ 102(e) Date: Aug. 1, 1997

[87] PCT Pub. No.: WO97/15028

PCT Pub. Date: Apr. 24, 1997

[30] Foreign Application Priority Data

Oct. 18, 1995 [JP] Japan ................................. 7-270394

[51] Int. Cl.$^6$ ............................................. A61B 5/103
[52] U.S. Cl. ........................ 600/587; 600/503; 600/595
[58] Field of Search .............................. 600/503, 587, 600/595

[56] References Cited

U.S. PATENT DOCUMENTS

| | | | |
|---|---|---|---|
| 4,962,469 | 10/1990 | Ono et al. ................................. | 364/561 |
| 5,065,414 | 11/1991 | Endou et al. .......................... | 377/24.2 |
| 5,475,725 | 12/1995 | Nakamura ................................. | 377/24.2 |
| 5,539,706 | 7/1996 | Takenaka et al. .......................... | 368/10 |
| 5,583,776 | 12/1996 | Levi et al. ................................. | 364/450 |
| 5,697,374 | 12/1997 | Odagiri et al. ............................ | 600/587 |
| 5,759,156 | 6/1998 | Hayakawa et al. ....................... | 600/503 |

FOREIGN PATENT DOCUMENTS

| | | |
|---|---|---|
| 63-262784 | 10/1988 | Japan . |
| 63-311586 | 12/1988 | Japan . |
| 5-76502 | 3/1993 | Japan . |

*Primary Examiner*—Max Hindenburg
*Assistant Examiner*—Charles Marmor, II
*Attorney, Agent, or Firm*—Mark P. Watson

[57] ABSTRACT

In order to be able to accurately measure pitch both during running and walking, the invention focuses on the fact that the second harmonic of the body movement can be detected at a high level during running and that the third harmonic of the body movement can be detected at a high level during walking, and is designed to be able to calculate pitch regardless of whether or not the user is running or walking, by using a high-level line spectrum appearing in the area that is at or above 100 times/minute, for example, as the reference wave, and by determining whether this reference wave is the second or third harmonic. Whether the reference wave is the second or third harmonic can be determined based on whether or not a high-level signal is present near a frequency that is ⅓ or ⅔ of the frequency of the reference wave, for example; and pitch can be calculated by determining that the reference wave is the second harmonic if no high-level signal is present in the above frequency band.

20 Claims, 14 Drawing Sheets

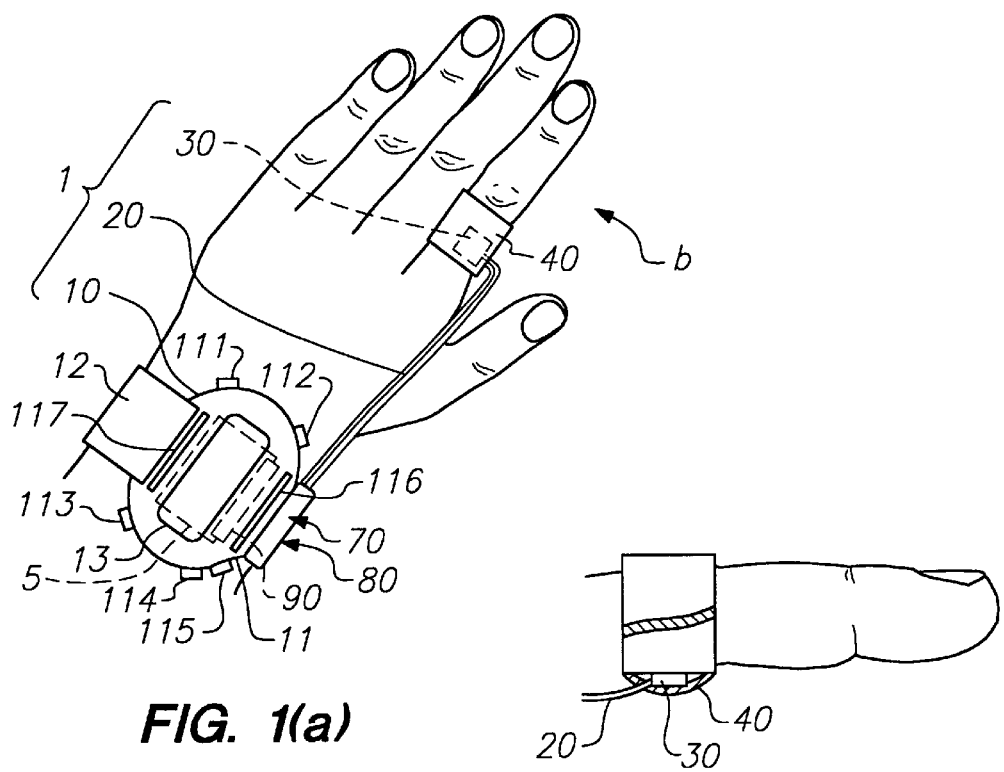
FIG. 1(a)
FIG. 1(b)
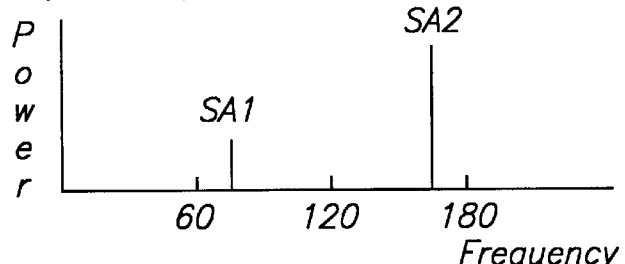
Example of spectrum obtained during running
FIG. 4(a)
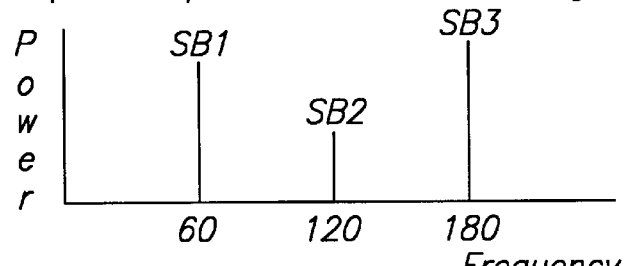
Example of spectrum obtained during walking
FIG. 4(b)

PITCH MEASUREMENT DEVICE, ELECTRONIC INSTRUMENT, AND PITCH MEASUREMENT METHOD

BACKGROUND OF THE INVENTION

1. Field of the Invention

The invention relates to a pitch measurement device for measuring a pitch that indicates the frequency at which a body part such as the leg moves while walking or running, to an electronic instrument equipped with a pitch measurement function, and to a pitch measurement method; and more particularly to a technology for determining pitch from the body movement signals detected during running or walking.

2. Description of the Related Art

Pitch counters are known that use a means such as an acceleration sensor that can detect the movements of a body (body movements) to obtain body movement signals and that determine a pitch from these body movement signals. Conventional pitch counters, for example, use a method that first amplifies body movement signals, next converts them into pulses, and then counts the pulses obtained. As shown in FIG. 16(a), the pulse wave obtained using this method has irregular pulse intervals depending on the running state, resulting in large measurement errors even if the pulses are counted by setting a specific threshold value. Therefore, a method has been adopted that improves the detection precision by counting pulses in units of two using a mask signal that can set a specific non-sensitive time during pulse counting, as shown in FIG. 16(a). The pitch indicating the frequency at which the right and left legs or hands move while running is normally between 150 to 200 times/minute, which can be converted into pulse cycles of between 0.3 to 0.4 seconds. Therefore, by using a mask signal with a masking time, or non-sensitive time, of 0.5 seconds, the pulse signals resulting from the conversion of body movement signals can be counted in units of two and pulses can be counted as pulses having pulse cycles of between 0.6 and 0.8 seconds. Therefore, pitches can be measured at high precision.

However, such a method results in extremely large errors if the walking pitch is measured using a mask signal in which the masking time was set for measuring running pitch. That is, as shown in FIG. 16(b), the pitch during walking is between 100 and 150 times. Therefore, a signal with a cycle of between 0.4 and 0.6 seconds is obtained when the body movement signal is converted into pulses. If a mask signal having the same masking time of 0.5 seconds as that used during running is applied to the above signal, pulses will be counted in units of one when the pitch is 100 times/minute, resulting in an error. Therefore, to use a conventional pitch counter to measure running or walking pitch, it is necessary to externally switch the mask signal between running and walking before starting pitch measurement. Pitches cannot be measured accurately if this switching operation is not performed before the start of the measurement, and may sometimes result in totally meaningless data. Furthermore, in an electronic instrument equipped with other multiple functions in addition to the pitch-measurement function, the user must memorize the method of switching mask signals, making the instrument extremely inconvenient to use.

Additionally, when body movement signals are supplied to the aforementioned measurement method using mask signals, it is not possible to use a personal computer, etc. to analyze their pitch unless it is known beforehand whether the data was obtained during walking or running.

OBJECTS OF THE INVENTION

Therefore, an object of the invention is to provide a pitch measurement device that does not require an external operation to switch between running and walking. Another object of the invention is to provide a pitch measurement device that can easily and accurately measure pitch both during running and walking. Still another object of the invention is to provide a user-friendly electronic instrument equipped with other multiple functions in addition to the pitch-measurement function, that can easily measure pitch. Therefore, it is also an object of the invention to provide a pitch measurement method that can automatically determine whether a body movement signal was obtained during running or walking and that can calculate the pitch for either case. It is still another object of the invention to provide a pitch measurement device and a pitch measurement method that can accurately determine whether a body movement signal was obtained during running or walking even when noise is present in the signal.

SUMMARY OF THE INVENTION

The inventors of the present invention have discovered the following when analyzing the frequency of the results detected from the movements of a body (body movements) during running or walking using a body movement sensor, such as an acceleration sensor. In addition to the fact that the fundamental frequency of the body movement differs during running and walking, harmonics such as the second harmonic which is two times the fundamental frequency and the third harmonic which is three times the fundamental frequency are obtained, and the intensity distribution of these harmonics have a distinct characteristics. That is, during running, a second harmonic is obtained that has an intensity (level) that is several times (3 to 10 times) the intensity of the fundamental harmonic having the frequency of the body movements. In contrast, during walking, the level of the second harmonic is equal to or smaller than the level of the fundamental harmonic; and a high-level third harmonic is obtained.

When body movements are measured by mounting an acceleration sensor, etc. on a body part, such as the arm, signals containing the acceleration changes caused by the body's up and down movements, the swinging of the arms, etc. are obtained as body movement signals. During running, it is thought that up and down movements of equal strength are caused when the right or left foot takes a step, and as a result, a high-intensity (level) body movement signal that corresponds to the second harmonic of the body movement is obtained. Furthermore it is thought that, because the swinging of the arms also causes instantaneous acceleration during both the forward and backward movements, a high-level body movement signal that corresponds to the second harmonic of the body movement is obtained. In contrast, because the body's up and down movements during walking are smaller than its movements during running, the level of the second harmonic is lower, and is nearly equal to or lower than the level of the body's fundamental harmonic. It is thought that, because the swinging of the arms is also more moderate during walking, the level of the fundamental harmonic which has the same cycle as the body movement is higher than the second harmonic. Additionally, a high-level third harmonic is obtained which is a harmonic vibration of these other frequencies.

Therefore, the invention is designed to calculate pitch during both running and walking by analyzing the frequency of the result obtained from a body movement sensor and by determining whether a high-intensity (level) signal that appears at or above the specified frequency is the second or third harmonic. That is, the pitch measurement device according to the invention has a body movement sensor for detecting body movements, a frequency analysis means for analyzing the frequency of the detection result of said body movement sensor, and a pitch calculation means for calculating pitch during running or walking from the analysis result of said frequency analysis means; wherein said pitch calculation means sets a signal whose power is at least equal to the specified level in the region that is at or above the first frequency setting in the analysis result, as the reference wave to be referenced for determining pitch, and calculates pitch by determining whether or not this reference wave is the second or third harmonic corresponding to the body movement.

The pitch displayed during running or walking is often twice the frequency of the body movement, i.e., the frequency of the second harmonic. Therefore, if the pitch calculation means determines the reference wave to be the second harmonic, it should preferably output the frequency of the reference wave as the pitch; and it should preferably output $2/3$ of the reference wave frequency as the pitch if the reference wave is determined to be the third harmonic. In this way, the pitch measurement device according to the invention can calculate pitch during both running and walking by simply determining whether the reference wave is the second or third harmonic, without using a mask signal, etc., and can output highly accurate pitches any time without requiring the user or the pitch measurement device to specify running or walking. That is, the measurement device according to the invention can measure pitch accurately both during running and walking, without the need for an external or internal operation to switch settings. Therefore, when measuring pitch using an electronic instrument into which other functions can be installed in addition to a pitch measurement function having a control device that can process signals from a body movement sensor and a display device that can display the output from this control device, the user can measure pitch easily and reliably without the need for selecting the running or walk setting.

As explained above, the pitch during walking is usually between 100 and 150, and the pitch during running is usually between 150 and 200. Therefore, it can be presumed that frequencies of 150 to 200 times/minute and 150 to 225 times/minute can be obtained for the second and third harmonics, respectively, and that any signals having frequencies lower than these are most likely noise. Therefore, this invention prevents pitch measurement errors caused by noise, by setting a value of around 100 times/minute, for example, which is sufficiently lower than the frequencies of the expected second and third harmonics, as the first frequency setting, and by evaluating signals having frequencies higher than this frequency setting. Of course, the first frequency setting is not limited to the aforementioned value and can be changed and adjusted by the person being measured or according to the measurement environment.

To determine whether the reference wave is the second or third harmonic, it is possible to install in the pitch calculation means a harmonic confirmation means that determines whether or not a high-level signal is present near at least a frequency that is $1/3$ or $2/3$ of the reference wave frequency inside the analysis result, and a signal determination means that determines the reference wave to be the second harmonic if no high-level signal is present near at least a frequency that is $1/3$ or $2/3$ of the reference wave frequency. For example, a first wave confirmation means that determines whether or not a high-level signal is present near a frequency that is $1/3$ of the reference wave frequency inside the analysis result can be adopted as the harmonic confirmation means, and the signal determination means can determine that the reference wave is the second harmonic if no high-level signal is present near a frequency that is $1/3$ of the reference wave frequency. It is also possible to adopt for the harmonic confirmation means, a second wave confirmation means that determines whether or not a high-level signal is present near a frequency that is $2/3$ of the reference wave frequency inside the analysis result, and it can be determined that the reference wave is the second harmonic if no such signal is present. Moreover, it is also possible for the harmonic confirmation means to determine whether or not a high-level signal is present near a frequency that is $1/3$ or $2/3$ of the reference wave frequency, and to determine that the reference wave is the second harmonic if no high-level signal is present near either a frequency that is $1/3$ of the reference wave frequency or a frequency that is $2/3$ of the reference wave frequency.

Additionally, by focusing on the fact that the frequency of the third harmonic obtained during walking is more stable than the frequency of the second harmonic obtained during running, it is possible to adopt a signal determination means that determines that the reference wave is the second harmonic if the pitch calculation means determines that the frequency of the fundamental harmonic is equal to or less than the second frequency setting. For example, since the expected frequency of the third harmonic obtained as the reference wave during walking is between 150 and 225 times/minute, it is possible to adopt 150 times/minute as the second frequency setting and to determine that the reference wave is the second harmonic if it is equal to or less than the above frequency. In this way, even if a high-level signal is present near a frequency that is $1/3$ or $2/3$ of the reference wave frequency, the high-level signal near the $1/3$ or $2/3$ frequency is determined to be a noise as long as the frequency of the reference wave does not exceed the second frequency setting, and the reference wave can be determined to be the second harmonic.

The method of calculating pitch by determining whether or not the reference wave is the second or third harmonic can also be used in a pitch measurement method that uses a personal computer, etc. for analyzing the detection result obtained from a body movement sensor. That is, the invention can provide a pitch measurement method having the steps described below.

1. A process for analyzing the frequency of body movements.
2. A pitch calculation process that sets as the reference wave, a signal whose power is at least equal to the specified level in the region that is at or above a first frequency setting in the analysis result, and determines pitch by determining whether or not this reference wave is the second or third harmonic corresponding to the body movement, when determining pitch during running or walking from the analysis result of the frequency analysis means.

As in the aforementioned measurement device, the pitch calculation process should preferably output the frequency of the reference wave as the pitch if the reference wave is determined to be the second harmonic, and should preferably output $2/3$ of the reference wave frequency as the pitch if the reference wave is determined to be said third harmonic. It is also possible to adopt in the pitch calculation process, processes equipped with the aforementioned functions, such as a harmonic confirmation process that determines whether or not a high-level signal is present near at least a frequency that is ⅓ or ⅔ of said reference wave frequency inside the analysis result, and a signal determination process that determines that the reference wave is said second harmonic if no high-level signal is present near a frequency that is ⅓ or ⅔ of the reference wave frequency.

Such a pitch measurement method according to the invention can be provided as a software program equipped with the aforementioned processes, and can be provided as a program stored in a medium such as a magnetic recording medium or ROM that can be read by a computer or microprocessor.

BRIEF DESCRIPTION OF THE DRAWINGS

FIGS. 1A and 1B show the external appearance of a portable electronic instrument in which the pitch measurement function according to the invention has been installed, and how this instrument is used.

FIG. 4 is a diagram showing examples of the spectrum obtained from analyzing the frequency of body movement signals; FIG. 4(a) shows an example of a spectrum obtained during running; FIG. 4(b) shows an example of a spectrum obtained during walking.

DESCRIPTION OF THE PREFERRED EMBODIMENTS

Figure 2:
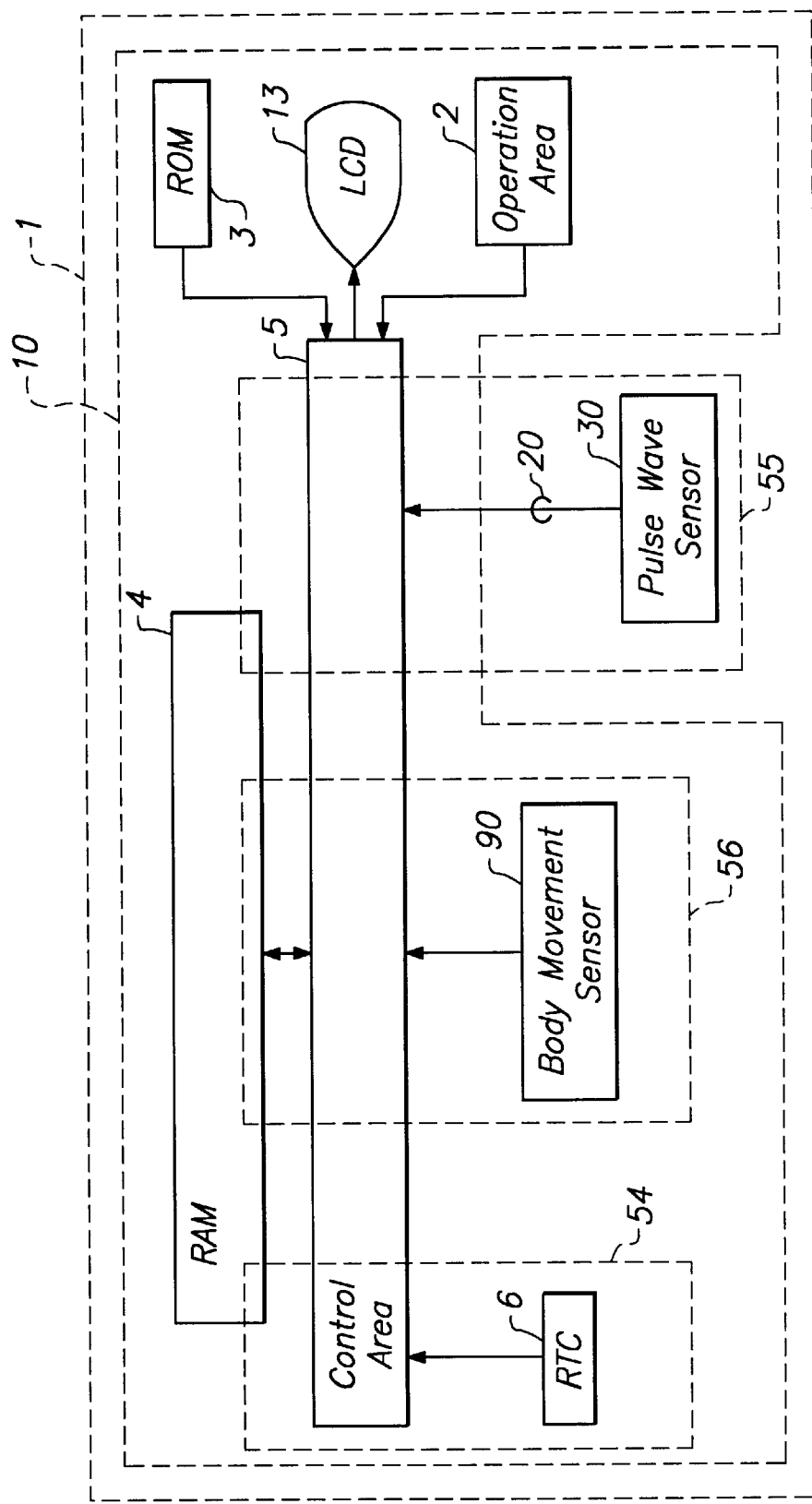
FIG. 2 is a block diagram showing a schematic configuration of the portable electronic instrument shown in FIG. 1.

Next, an embodiment of the invention will be explained with references to the drawings.

FIGS. 1A and 1B show a wristwatch type portable electronic instrument equipped with the pitch measurement function according to the invention. This portable electronic instrument 1 is provided with a clock function that can be used as a wristwatch, a pulse count measurement function that can measure and display a pulse wave, and with a pitch measurement function that can measure a pitch that indicates the frequency of movements of a body part, such as an arm or leg, during running or walking. As shown in the figure, portable electronic instrument 1 in this embodiment is equipped with device main body 10 possessing a wristwatch structure, and this main body contains body movement sensor 90, such as an acceleration sensor, for detecting the movements in the user's body (body movements), and control area 5 for implementing the aforementioned various functions, etc. Liquid crystal display device 13, which displays various data such as time, pulse, and pitch as well as performing a user-interface function, is installed on the surface of main body 10; and furthermore, multiple operation switches 111, 112, 113, 114, 115, 116, and 117 for controlling the various functions are installed on the top and side surfaces of main body 10. Additionally, pulse wave detection sensor unit 30 is connected to main body 10 via cable 20, so that pulse waves from the finger can be detected. Wristband 12, which is wrapped around the wrist from the 12 o'clock direction of the wristwatch (hereafter, all directions relative to main body 10 will be indicated in terms of clock directions) and fastened in the 6 o'clock direction, is installed in said main body 10, enabling device main body 10 to be detachably mounted on the user's wrist.

FIG. 2 shows a schematic configuration of electronic instrument 1 of this embodiment in a block diagram. Electronic instrument 1 of this embodiment is configured around control area 5 which comprises an element such as a microprocessor, and is provided with ROM 3 which stores the programs and data necessary for processing in the control area 5, RAM 4 to be used as a temporary storage area for processing and for accumulating measurement data, etc., and operation area 2 for controlling control area 5. Operation area 2 is provided with various switches 111 through 117 installed on the top surface or perimeter of main body 10 as explained above. Additionally, electronic instrument 1 of this embodiment is equipped with liquid crystal panel 13 for user interface as explained above, and the liquid crystal display device 13 displays information such as time, measured data, and processing mode.

Electronic instrument 1 of this embodiment is additionally provided with real-time clock (RTC) unit 6 which has an oscillation function for timing, a function for measuring time of day and date, etc.; and clock processing area 54 which performs various clock operations (to be explained below in conjunction with the operation of the electronic instrument) is configured utilizing the functions of this RTC unit 6. Additionally, electronic instrument 1 of this embodiment is equipped with pitch measurement area 56 which can measure a pitch by using control area 5 to process the signal from body movement sensor 90 housed inside main body 10, and with pulse measuring area 55 which can measure pulses by using control area 5 to process the signal from pulse wave sensor 30 which is connected with main body 10 via cable 20.

Pitch Measurement

Figure 3:
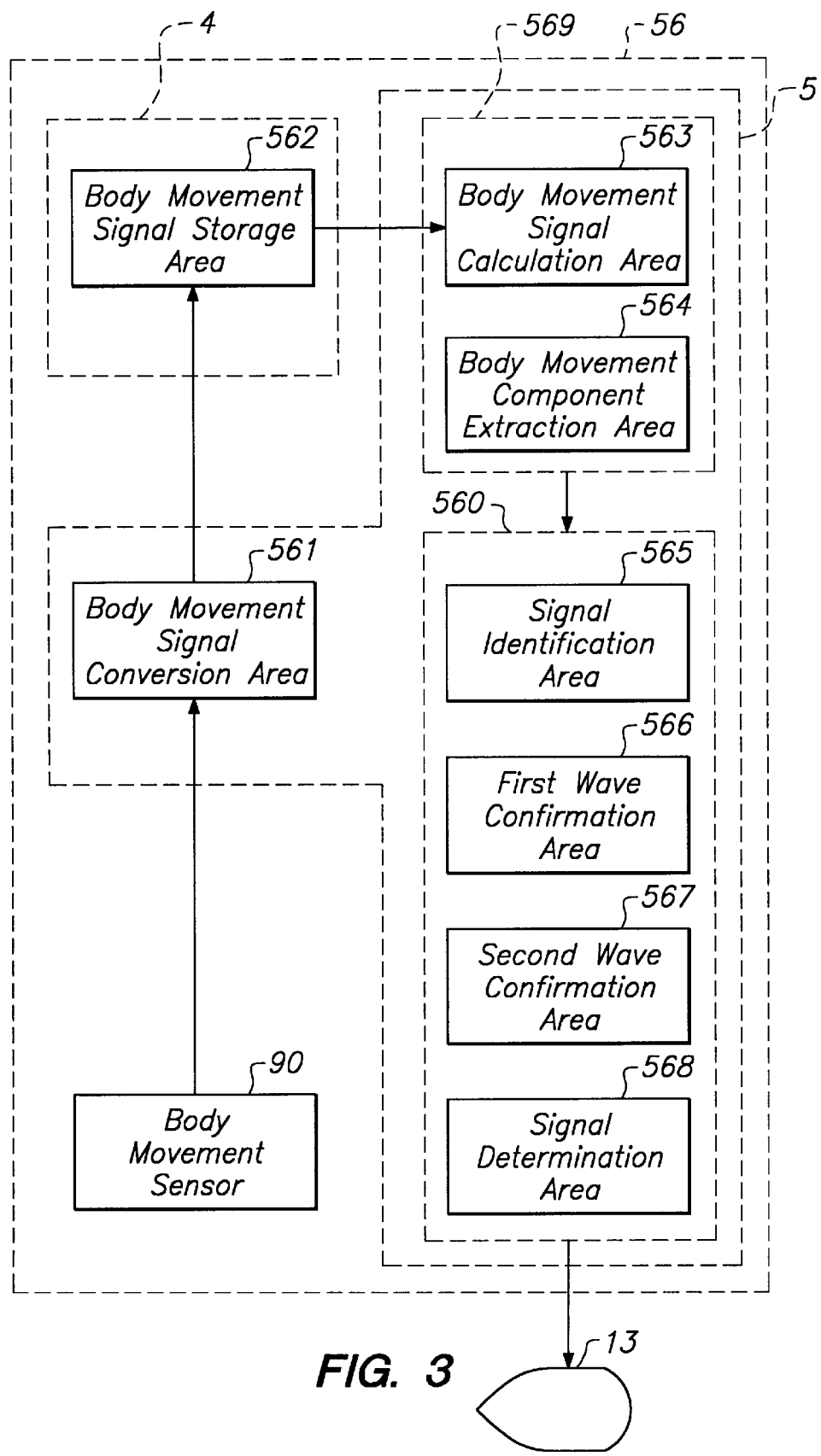
FIG. 3 is a block diagram showing a schematic configuration of the pitch measurement device installed in the electronic instrument shown in FIG. 1.

FIG. 3 shows more detailed configuration of pitch measurement area 56 of this embodiment. In pitch measurement area 56 of this embodiment, body movements are detected by body movement sensor 90 and the resulting signals are input into body movement signal conversion area 561 of control area 5. Body movement signal conversion area 561 amplifies the signal obtained by body movement sensor 90 and at the same time converts the signal into easy-to-process digital data, and then outputs and temporarily stores this data in body movement signal storage area 562 of RAM 4. Of course, it is also possible to continuously accumulate this data and supply the accumulated data to a processing device such as a personal computer, and use the data for analyzing pitch. The data accumulated in body movement signal storage area 562 is fetched by frequency analysis area 569 of control area 5 at the specified intervals and its frequency is analyzed. Frequency analysis area 569 is provided with body movement signal calculation area 563 which reads the signals stored in body movement signal storage area 562 and applies frequency analysis and fast Fourier transformation (FFT processing) to the signals, and with body movement component extraction area 564 which can extract a frequency and a signal intensity (level) from the frequency analysis result as body movement components. The body movement components extracted by body movement component extraction area 564 are supplied to pitch calculation area 560 provided in control area 5, the pitch during running or walking is calculated by this pitch calculation area 560, and the result can be displayed on liquid crystal display device 13.

Pitch calculation area 560 of this embodiment is provided with signal identification area 565 which identifies a signal whose intensity is at least equal to the specified level in the area that is at least equal to the specified frequency (first frequency setting) as the reference wave to be referenced for determining a pitch, first wave confirmation area 566 which determines whether or not a high-level signal is present near a frequency that is ⅓ of the identified reference wave frequency, second wave confirmation area 567 which determines whether or not a high-level signal is present near a frequency that is ⅔ of the reference wave frequency, and with signal determination area 568 which determines that the identified reference wave is the second harmonic for the fundamental harmonic equipped with the body movement's basic frequency if first wave confirmation area 566 determines that no high-level signal is present near a frequency that is ⅓ of the reference wave frequency and if second wave confirmation area 567 determines that no high-level signal is present near a frequency that is ⅔ of the reference wave frequency.

Signal determination area 568 determines that the identified reference wave is the third harmonic for the fundamental harmonic if the confirmation results of first wave confirmation area 566 and second wave confirmation area 567 show that a high-level signal is present near a frequency that is ⅓ or ⅔ of the reference wave frequency. However, in this operation, signal determination area 568 is designed to determine that the reference wave is the third harmonic only if the reference wave is at least equal to the specified frequency (second frequency setting) and to determine that the reference wave is the second harmonic if the reference wave is equal to or less than the second frequency setting.

FIG. 4 shows examples of the signal (spectrum) obtained by body movement signal calculation area 563 and body movement component extraction area 564. FIG. 4(*a*) shows an example of a spectrum obtained during running; FIG. 4(*b*) shows an example of a spectrum obtained during walking. Since a distinct difference exists between the spectrums obtained during running and walking as shown in these figures, pitch measurement area 56 of this embodiment is designed to automatically sense this difference in spectrum and to automatically measure accurate pitch during running or walking.

The difference in spectrum obtained during running and walking is presumed to be caused by the following reasons: First, in the typical spectrum obtained during running shown in FIG. 4(*a*), line spectrum SA1 which corresponds to the fundamental harmonic of the body movement and line spectrum SA2 which corresponds to the second harmonic component of the fundamental harmonic of the body movement appear. Of these, line spectrum SA2 which corresponds to the second harmonic component is considerably higher in level than line spectrum SA1 which corresponds to the fundamental harmonic. Several reasons are possible for this phenomenon. First, during running, up and down movements of equal magnitude are caused when the right or left foot takes a step, and consequently the second harmonic of the body movement component tends to appear at a high level. Second, since swinging of an arm is equivalent to a pendulum motion in which forward and backward swings of an arm constitute one cycle, this motion produces the fundamental harmonic of the body movement. However, because it is difficult to keep the swinging of the arms in a smooth pendulum motion during running, the level of the fundamental harmonic caused by arm swings tend to be weak. Third, acceleration is applied during the instances of forward and backward swings of the arm. Consequently, the second harmonic of the fundamental harmonic of the arm swing is detected at a higher level by the body movement sensor. During running, these causes lead to the second harmonic that is considerably higher in level than the fundamental harmonic of the body movement.

In contrast, in the typical spectrum obtained during walking shown in FIG. 4(*b*), line spectrum SB1 which corresponds to the fundamental harmonic of the body movement, line spectrum SB2 which corresponds to the second harmonic component of the fundamental harmonic of the body movement, and line spectrum SB3 which corresponds to the third harmonic component of the fundamental harmonic of the body movement appear. During walking, the up and down movements are smaller than those during running, and the fundamental harmonic component of the body movement caused by the arm swing appears distinctly, and thus line spectrum SB1 which corresponds to the fundamental harmonic characteristically appears distinctly. As a result, although the ratio between spectrums SB1 and SB2 does not remain constant, the ratio of line spectrum SB2 of the second harmonic to line spectrum SB1 of the fundamental harmonic obtained during walking increases compared to that obtained during running. Furthermore, line spectrum SB3 which indicates the third harmonic appears, and both line spectrum SB1 which corresponds to the fundamental harmonic and line spectrum SB3 which corresponds to the third harmonic component are higher in level than SB2 which corresponds to the second harmonic component.

Moreover, since the pitch (the frequency of the second harmonic is normally used) during running is between 150 and 200 times/minute and the pitch during walking is between 100 and 150 times/minute, the second harmonic during running and the third harmonic during walking appear in approximately the same frequency band. Therefore, by identifying a high-level signal that is at least equal to the specified frequency (first frequency setting) and by determining whether this signal is the second or third harmonic, whether a spectrum was obtained from body movements caused by running or walking can be automatically determined. By outputting the frequency of the signal as the pitch if the signal is determined to be the second harmonic, and by outputting a value that is ⅔ the frequency as the pitch if the signal is determined to be the third harmonic, a highly accurate pitch can be displayed or output regardless of whether the user is running or walking.

In the spectrum example shown in FIG. 4, if 100 times/minute, which is slightly lower than the frequency band in which the aforementioned second or third harmonic is expected to appear, is set as the first frequency setting, line spectrum SA2 which corresponds to the second harmonic during running, line spectrum SB2 which corresponds to the second harmonic during walking, and line spectrum SB3 which corresponds to the third harmonic during walking become the potential targets that can be identified as the reference wave. By monitoring the frequency region at or above 100 times/minute and by determining whether a high-level signal appearing in this region is the second or third harmonic for the fundamental harmonic, the pitch during running or walking can be accurately calculated. That is, the third harmonic will appear as a high-level signal in the frequency region at or above 100 times/minute during walking. Therefore, if this signal can be determined to be the third harmonic, the pitch during walking can be calculated from the value resulting from multiplying the frequency of this signal by ⅔. On the other hand, the second harmonic for the fundamental harmonic will appear as a high-level signal in the frequency region at or above 100 times/minute during running. Therefore, if this signal can be determined to be the second harmonic, the pitch during running can be calculated from the frequency of this signal.

Figure 5:
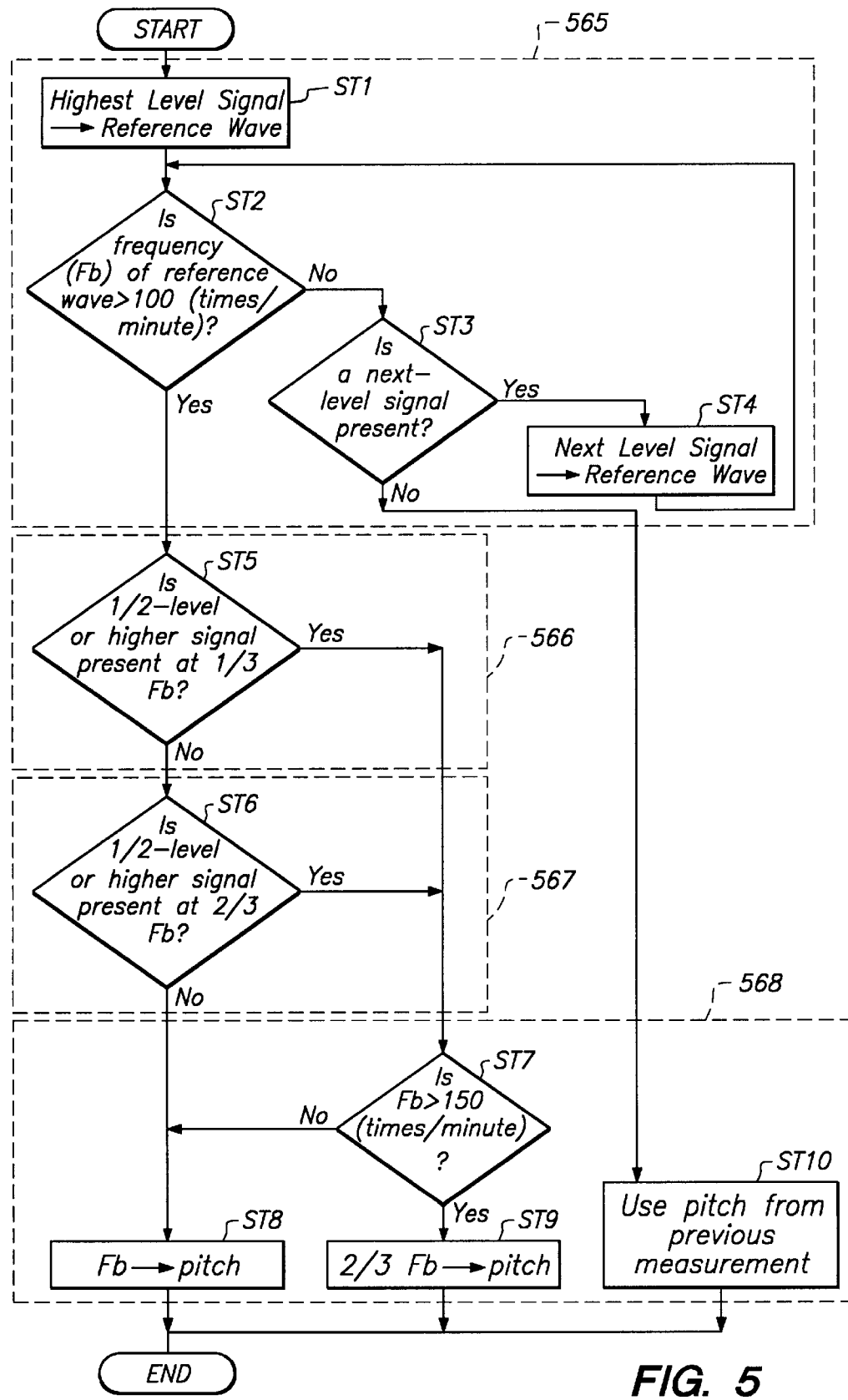
FIG. 5 is a flow diagram showing the processing in the pitch measurement device shown in FIG. 3.

The flow diagram shown in FIG. 5 will be used to explain the process in which pitch calculation area 560 of the pitch measurement area of this embodiment determines a pitch utilizing the difference in spectrums during running and walking. First, in step ST1, signal identification area 565 is used to identify the highest-level signal (line spectrum) from among the spectrums extracted after frequency analysis. This signal is identified as the reference wave to be referenced during pitch determination. Next, in step ST2, the frequency (Fb) of this reference wave is compared to 100 times/minute which is the first frequency setting. If the frequency of the reference wave is less than 100 times/minute, the highest-level signal is retrieved from among the signals that exclude the earlier signal, in step ST3. If no applicable signal is found in step ST3, the processing explained below is bypassed and the operation shifts to signal determination area 568, and the pitch calculated in the previous round is processed as the current pitch in step ST10, and then the processing is completed.

On the other hand, if the next level signal is detected in step ST3, the operation shifts to step ST4 and the highest-level signal among the signals that exclude the earlier signal is identified as the reference wave. The operation then returns to step ST2 and the frequency of this reference wave is compared to the first frequency setting.

If the signal is determined to be a high-level signal of 100 times/minute or higher in step ST2, step ST5 then uses first wave confirmation area 566 to determine whether a signal possessing an intensity (amplitude or level) that is at least ½ of the intensity (amplitude or level) of the reference wave is present near a frequency that is ⅓ of frequency Fb of the identified reference wave. If the reference wave is the third harmonic, a high-level signal indicating the fundamental harmonic of the body movement should appear near a frequency that is ⅓ of frequency Fb of the reference wave; and by detecting this signal, it is possible to determine whether this signal is the second or third harmonic. When determining whether or not a high-level signal is present near a frequency that is ⅓ of the reference wave frequency, it is preferable to determine that a high-level signal is present near a frequency that is ⅓ of the reference wave frequency if that signal is within the range of +/−1 resolution of the frequency resolution in which the aforementioned line spectrums are obtained; and if a higher resolution is available, it is preferable to select a frequency range that corresponds to that resolution as the determination target, although the actual situation will depend on the capability of frequency analysis area 569 which performs frequency analysis.

If it is determined in step ST5 that no signal having at least ½ the level of the reference wave is present near a frequency that is ⅓ of frequency Fb of the reference wave, the operation shifts to step ST6. In step ST6, second wave confirmation area 567 is used to determine whether or not a signal having at least ½ the level of the reference wave is present near a frequency that is ⅔ of the reference wave frequency. If the reference wave is the third harmonic, a high-level signal indicating the second harmonic should appear near a frequency that is ⅔ of frequency Fb of the reference wave; and by detecting this signal, it is possible to determine whether this signal is the second or third harmonic. It is preferable in this step, as in the earlier step, to select a frequency range that corresponds to the resolution used for frequency analysis as the determination target.

If the reference wave is the third harmonic, fairly intense signals indicating the fundamental and second harmonics of the body movement are usually obtained as explained above. Therefore, it is of course possible to use only one of the aforementioned steps ST5 and ST6, i.e., first wave confirmation area 566 or second wave confirmation area 567, to determine whether a signal is the second or third harmonic. Or, as in this embodiment, both steps ST5 and ST6, i.e., first wave confirmation area 566 and second wave confirmation area 567, can be used to determine whether a signal is the second or third harmonic. Using such a configuration makes it possible to accurately calculate the pitch even for a user whose body movement pattern is slightly different from a normal one, e.g., the fundamental or second harmonic level is extremely low in the state in which the third harmonic can be obtained (during walking). Although a signal is determined to be high if its level is at least ½ the level of the reference wave in this embodiment, this value is just an example and any level is of course acceptable as long as it can be differentiated from the noise contained in the signal obtained after amplifying and converting the signal from a body movement sensor and after analyzing this signal's frequency.

If no high-level signal is present near a frequency of either ⅓ or ⅔ of frequency Fb of the reference wave in steps ST5 or ST6, the reference wave can be determined to be a signal equivalent to the second harmonic. Therefore, the operation shifts to step ST8, and signal determination area 568 calculates frequency Fb of the reference wave itself as the pitch.

Of course, when calculating the frequency of the body movement as a pitch, it is also possible to calculate ½ frequency Fb of the reference wave.

In contrast, if a high-level signal is present near a frequency that is ⅓ of frequency Fb of the reference wave in steps ST5, or if a high-level signal is present near a frequency that is ⅔ of frequency Fb of the reference wave in steps ST6, the operation shifts to step ST7 and frequency Fb of the reference wave is compared to 150 times/minute which is the second frequency setting. This second frequency setting of 150 times/minute is a value that is 1.5 times the first frequency setting value of 100 times/minute. In normal cases, the pitch during walking is between 100 and 150 times/minute, and a reference wave of between 150 and 225 times/minute is expected to be obtained as the third harmonic. The pitch during running is between 150 and 200 times/minute, and a reference wave having nearly identical frequency of between 150 and 200 times/minute is expected to be obtained as the second harmonic. However, since the pitch during walking is presumed to be more stable than the pitch during running, the probability that a signal having a frequency of 150 times/minute or lower can be obtained as the third harmonic is extremely low. Therefore, the identified reference wave is determined to be the third harmonic only if frequency Fb of the reference wave is determined to be 150 times/minute or higher in step ST7. On the other hand, if frequency Fb of the reference wave is lower than 150 times/minute, the high-level signal detected in step ST5 or ST6 is simply a noise and the reference wave is determined to be the second harmonic. This second frequency setting of 150 times/minute is of course just an example value and can be changed/adjusted by the user or based on the measurement condition. By using the second frequency setting to determine whether or not a signal is the second harmonic in step ST7 as explained above, it becomes possible to prevent the erroneous determination that the signal is the third harmonic, even when a high-level noise is present near a frequency that is ⅓ or ⅔ of the reference wave frequency. Therefore, the pitch measurement device according to the invention can automatically calculate extremely accurate pitches by adapting to the changes in conditions during running or walking.

If the reference wave is determined to be the second harmonic in step ST7, the operation shifts to step ST8 and frequency Fb of the reference wave is output as the pitch as explained above. On the other hand, if the reference wave is determined to be the third harmonic, the operation shifts to step ST9 and frequency Fb of the reference wave is multiplied by ⅔ and is output as the pitch. Of course, to adopt the fundamental harmonic of the body movement as the pitch, it is necessary to calculate ⅓ frequency Fb of the reference wave.

Of course, pitch measurement area 56 equipped with the aforementioned functions can be implemented as one of the functions of a multi-function electronic instrument 1 as in this embodiment, or can be provided as a pitch counter equipped with a single pitch measurement function. Of course, the process of determining a pitch explained based on FIG. 5 can also be implemented as a software program when using a personal computer, etc. to analyze the data obtained from a body movement sensor. A software program that utilizes the pitch measurement method according to the invention does not require the user to specify running or walking and yet can automatically determine whether the user is running or walking, can calculate pitch according to the condition at an extremely high accuracy, and can be applied to various analysis programs. Such a software program can be provided as a program stored in a magnetic recording medium such as a floppy disk and hard disk, or in a medium such as a CD and ROM that can be read by a computer, microprocessor, etc.

Overall Configuration of the Portable Electronic Instrument

The configuration and operation of the aforementioned portable electronic instrument equipped with the pitch measurement function according to the invention will be explained below.

Returning to FIG. 1, pulse wave detection sensor unit 30 is connected via cable 20 to main body 10 of portable electronic instrument 1 in this embodiment, having the wristwatch structure. Connector piece 80 is provided on the tip side of cable 20, and the connector piece 80 can be detachably installed in connector area 70 provided on the 6 o'clock side of device main body 10. Pulse wave detection sensor unit 30 is attached to the area between the base and the first joint of the index finger and is shielded from light by sensor-fastening strap 40. Attaching pulse wave detection sensor unit 30 to the base of a finger in this way keeps cable 20 short and prevents it from getting in the way during running. Furthermore, taking into consideration the temperature distribution between the palm and finger tip in cold weather, the temperature at the finger tip falls substantially, while the temperature at the base of the finger falls relatively little. Therefore, attaching pulse wave detection sensor unit 30 at the base of the finger enables pulse count, etc. to be accurately measured even while running outside on a cold day.

Figure 6:
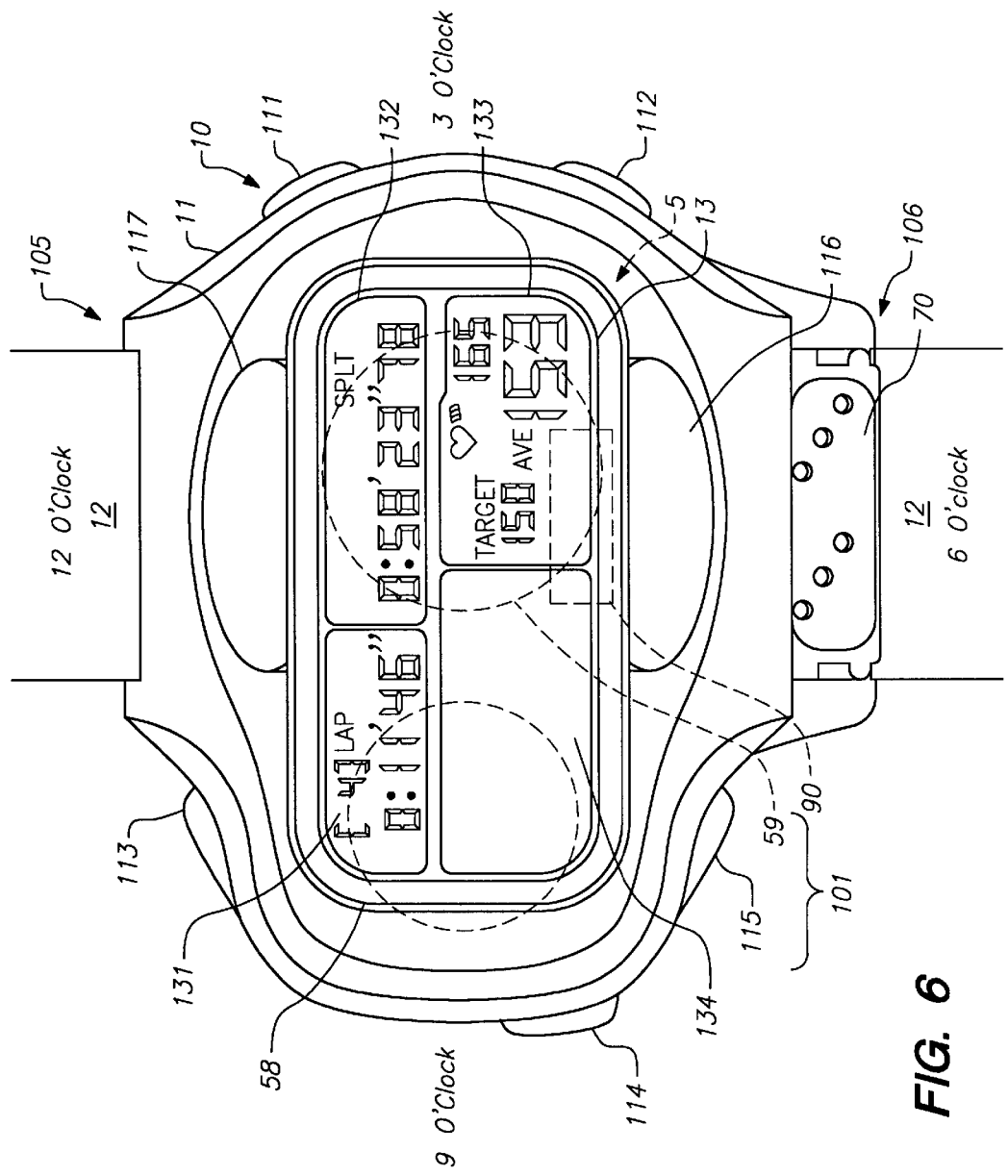
FIG. 6 shows the top view of the device main body of the portable electronic instrument shown in FIG. 1.
Figure 7:
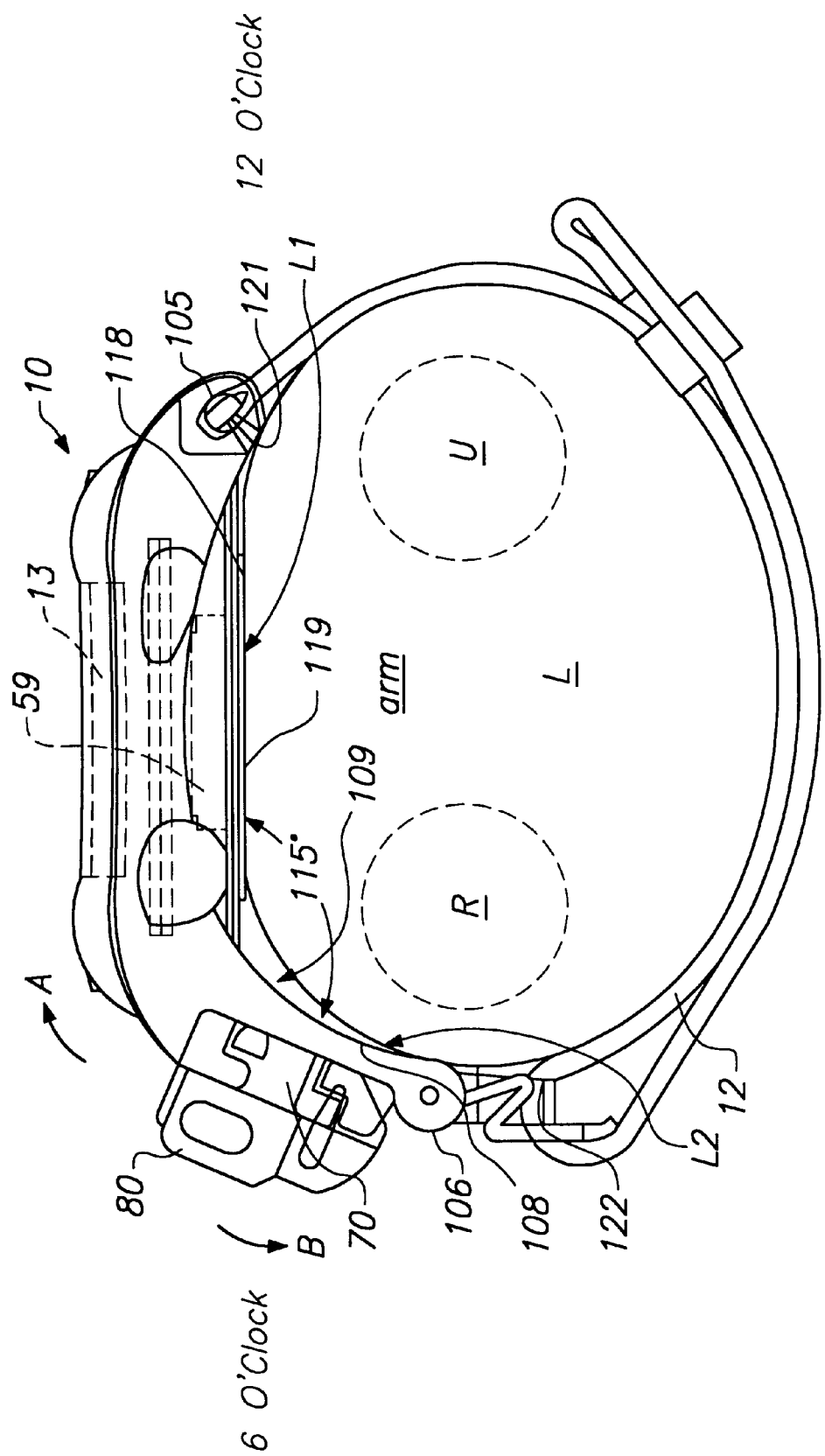
FIG. 7 is a diagram of the device main body of the portable electronic instrument shown in FIG. 1, viewed from the 3 o'clock direction of the watch.

FIG. 6 shows main body 10 of the portable electronic instrument of this embodiment, with the wristband and cable removed; FIG. 7 shows a view of the portable electronic instrument, obtained from the 3 o'clock direction of the main body.

As shown in FIG. 6, device main body 10 of this embodiment is provided with plastic watch case 11 (body case), and the top side of this watch case 11 is provided with liquid crystal display device 13 (display device) with an EL backlight for displaying running time, pitch during walking, and pulse wave information such as pulse count, in addition to current time and date. Liquid crystal display device 13 is provided with first segment display area 131 positioned on the upper left side of the display surface, second segment display area 132 positioned on the upper right side of the display surface, third segment display area 133 positioned on the lower right side of the display surface, and dot display area 134 positioned on the lower left side of the display. Dot display area 134 can graphically display various types of information.

As explained above, body movement sensor 90 for determining a pitch is housed inside watch case 11, and an acceleration sensor, etc. can be used as this body movement sensor 90. Furthermore, control area 5, which performs various types of control and data processing in order to determine a pitch based on the detection result (body movement signal) obtained by body movement sensor 90 and to display the result on liquid crystal display device 13, as well as in order to determine the change in pulse count based on the detection result (pulse wave signal) obtained by pulse wave detection sensor unit 30 and to display the result on liquid crystal display device 13, is provided inside watch case 11. Control area 5 is also provided with a timing circuit and thus can display normal time, lap time, split time, etc. on liquid crystal display device 13.

Button switches 111 through 115, which are used for external operations such as time adjustment and display mode switching, are provided on the perimeter of watch case 11. Additionally, larger button switches 116 and 117 are provided on the surface of the watch case. Furthermore, button-shaped small battery 59 which acts as the power supply for portable electronic instrument 1 is housed inside watch case 11, and electrical power can also be supplied from battery 59 to pulse wave detection sensor unit 30 via cable 20. This cable 20 is also used for inputting the detection result of pulse wave detection sensor unit 30 into control area 5 of watch case 11.

Because portable electronic instrument 1 of this embodiment is a multifunction device, the size of device main body 10 must be increased as more functions are added. However, it is difficult to extend device main body 10 in the 6 or 12 o'clock directions of the watch because it must be worn around a wrist. Therefore, in this embodiment, by using watch case 11 which is longer in the 3 and 9 o'clock directions than in the 6 and 12 o'clock directions, device main body 10 can house a control area that can implement a large number of functions or other functional units. Even though watch case 11 is extended in the 3 and 9 o'clock directions, wristband 12 is connected eccentrically toward the 3 o'clock side, leaving large extended area 101 in the 9 o'clock direction of the wristwatch, viewed from wristband 12. However, no such extended area is provided in the 3 o'clock direction. Consequently, this structure, despite the use of long watch case 11, allows free wrist movement and eliminates the possibility of the back of the hand striking watch case 11 during a fall.

Flat piezoelectric element 58 for a buzzer is positioned in the 9 o'clock direction, viewed from battery 59, inside watch case 11. Battery 59 which is heavier than piezoelectric element 58 is positioned eccentrically in the 3 o'clock direction so that the center of gravity of device main body 10 is shifted in the 3 o'clock direction. Because wristband 12 is connected to a spot near this center of gravity, device main body 10 can be securely attached to the wrist. Furthermore, the positioning of battery 59 and piezoelectric element 58 in the planar direction allows device main body 10 to be thin, and battery cover 118 installed on the back side as shown in FIG. 7 allows the user to easily replace battery 59.

As shown in FIG. 7, connecting area 105 for holding stopping pin 121 installed on the end of wristband 12 is formed in the 12 o'clock direction of watch case 11. Receiving area 106 is provided in the 6 o'clock direction of watch case 11, and fastener 122 for holding in place the middle point of wristband 12 wound around the wrist and folded back in the longitudinal direction of the band, is formed on said receiving area 106.

In the 6 o'clock direction of device main body 10, the area from bottom surface 119 to receiving area 106 is formed as an integral part of watch case 11 and forms rotation stop area 108 which is positioned at approximately 115° from bottom surface 119. That is, when wristband 12 is used to attach device main body 10 to top area L1 (side of the back of the hand) of right wrist L (arm), bottom surface 119 of watch case 11 tightly contacts top area L1 of wrist L while rotation stop area 108 contacts side area L2 where radius R is located. In this state, bottom surface 119 of device main body 10 more or less straddles radius R and ulna U, while rotation stop area 108 and the area between bent area 109 of bottom surface 119 and rotation stop area 108 contact radius R. Because rotation stop area 108 and bottom surface 119 form an anatomically ideal angle of approximately 115° as explained above, device main body 10 will not turn around arm L even if an attempt is made to turn it in the direction of arrow A or B. Furthermore, because the rotation of device main body 10 is restricted only in two locations on the side of the arm by bottom surface 119 and rotation stop area 108, bottom surface 119 and rotation stop area 108 securely contact the arm even if it is thin, and provide a secure rotation stopping effect and comfortable fit even if the arm is thick.

Pulse Wave Detection Function

Figure 8:
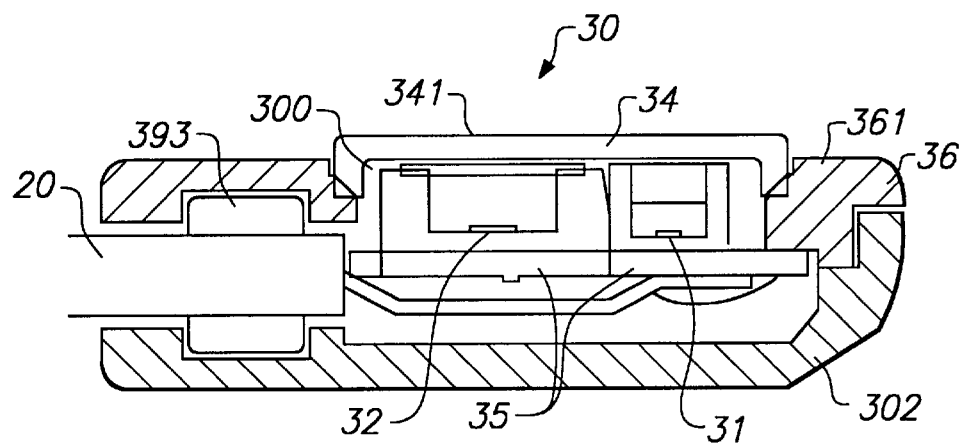
FIG. 8 is a cross-sectional diagram of the pulse-detection sensor unit used in the portable electronic instrument shown in FIG. 1.

FIG. 8 shows a cross-section of the pulse wave detection sensor unit mounted in electronic instrument 1 of this embodiment. In pulse wave detection sensor unit 30 of this embodiment, component housing space 300 is formed by placing back lid 302 on the bottom side of sensor frame 36 which constitutes a casing body. Circuit board 35 is positioned inside component housing space 300. LED 31, phototransistor 32, and other electronic components are mounted on circuit board 35. One end of cable 20 is fastened to pulse wave detection sensor unit 30 by bushing 393, and various wires of cable 20 are soldered to various patterns on circuit board 35. As shown in FIG. 1(b), pulse wave detection sensor unit 30 is attached to the finger such that cable 20 is extended from the base of the finger toward device main body 10. Therefore, LED 31 and phototransistor 32 are arranged along the length of the finger, with LED 31 positioned on the finger tip side and phototransistor 32 positioned at the base of the finger. This configuration provides the effect of making it difficult for the ambient light to reach phototransistor 32.

In pulse wave detection sensor unit 30, a light transmission window is formed by translucent plate 34 which is made of a glass plate on the upper area (actual pulse wave signal detection area) of sensor frame 36, and the light-emitting surface and light-receiving surface of LED 31 and phototransistor 32, respectively, are positioned by being oriented toward the translucent plate 34. Because of such a configuration, when a finger surface is pressed onto external surface 341 (surface that contacts the finger surface, or sensor surface) of translucent plate 34, LED 31 emits light toward the finger surface and phototransistor 32 can receive part of the light emitted by LED 31 that is reflected by the finger. Note that external surface 341 of translucent plate 34 protrudes farther than surrounding area 361 in order to improve its contact with the finger surface.

in this embodiment, an InGaN (indium-gallium-nitrogen) blue LED is used as LED 31, and its emission spectrum possesses a peak at 450 nm and its emission wavelength ranges from 350 to 600 nm. To match with LED 31 possessing such characteristics, a GaAsP (gallium-arsenic-phosphorus) phototransistor is used as phototransistor 32, and the light-receiving wavelength of the element itself ranges from 300 to 600 nm, with some sensitive areas also at or below 300 nm.

When pulse wave detection sensor unit 30 in this embodiment is attached to the base of the finger by sensor-fastening strap 40 and light is emitted from LED 31 toward the finger, the light reaches blood vessels, and part of the light is absorbed by the hemoglobin in the blood and part of it is reflected. The light reflected by the finger (blood) is received by phototransistor 32, and the change in the amount of received light corresponds to the change in the blood volume (pulse wave in the blood). That is, the reflected light becomes weak when the blood volume is high and becomes strong when the blood volume is low. Therefore, pulse count, etc. can be measured by detecting the changes in the intensity of the reflected light.

This embodiment uses LED 31 with an emission wavelength range of between 350 and 600 nm and phototransistor 32 with a light-receiving wavelength range of between 300 and 600 nm, and vital information is displayed based on the results taken in the overlapping wavelengths of between approximately 300 and approximately 600 nm, i.e., wavelengths of approximately 700 nm or shorter. When such pulse wave detection sensor unit 30 is used, even if the ambient light strikes the exposed part of the finger, lights with wavelengths of 700 nm or shorter contained in the ambient light do not use the finger as a light guide to reach phototransistor 32 (light-receiving area). The reason for this is as follows. Because lights with wavelengths of 700 nm or shorter contained in the ambient light do not easily penetrate the finger, the ambient light reaching the area of the finger not covered by the sensor fastening strap 40 will not penetrate the finger to reach phototransistor 32. In contrast, if an LED possessing an emission peak at around 880 nm and a silicon phototransistor are used, a light-receiving wavelength range of between 350 and 1,200 nm will result. In such a case, changes in the ambient light level tend to cause measurement errors because pulse waves will be detected using a light with 1 im wavelength which can use the finger as a light guide to easily reach phototransistor 32.

Furthermore, because pulse wave information is obtained using lights with approximately 700 nm or shorter wavelengths, the S/N ratio of the pulse wave signal based on blood volume change is high. The reason for this is as follows. The absorption coefficient of hemoglobin in the blood for lights with wavelengths of between 300 and 700 nm is several times to approximately one hundred or more times larger than the absorption coefficient for a light with wavelength of 800 nm which has been conventionally used as the detection light. As a result, lights with wavelengths of between 300 and 700 nm change sensitively to blood volume changes, producing higher pulse wave detection rate (S/N ratio) based on blood volume change.

Figure 9:
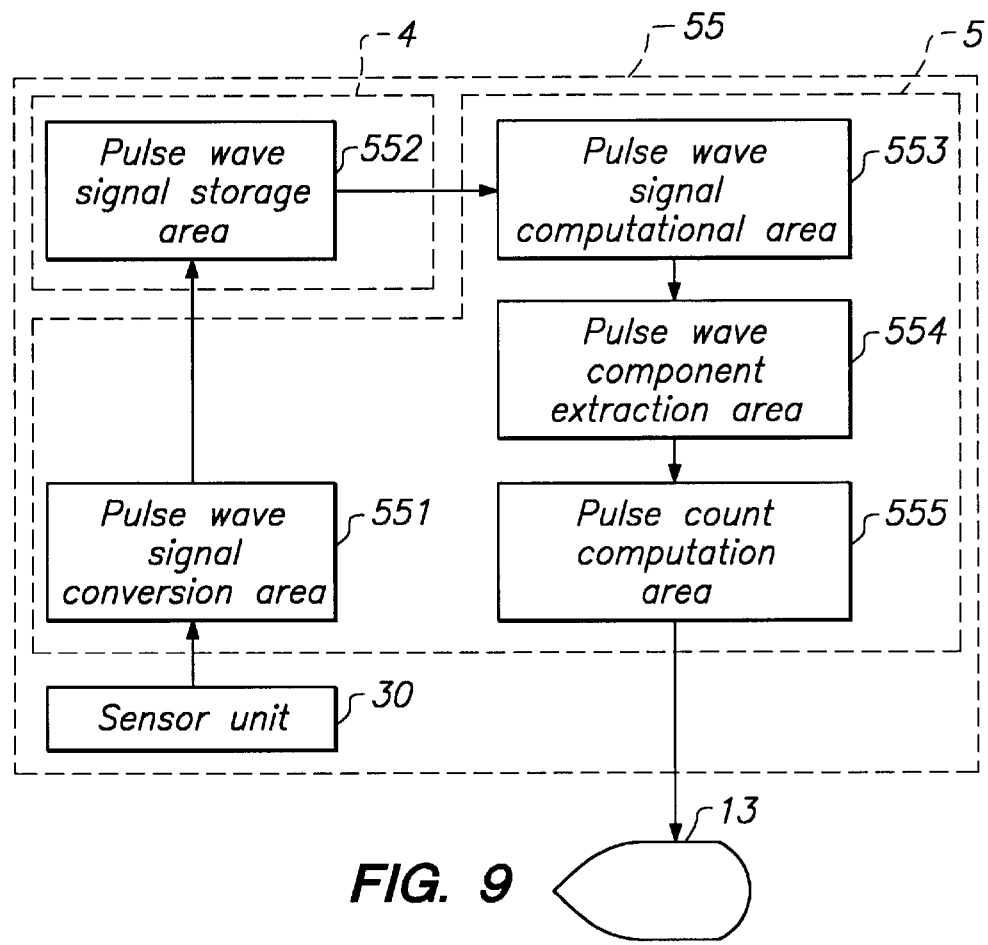
FIG. 9 is a block diagram schematically showing the configuration of the pulse wave detection device installed in the portable electronic instrument shown in FIG. 1.

FIG. 9 schematically shows the configuration of pulse wave measuring area 55 which determines a pulse count, etc. based on the result input from pulse wave detection sensor unit 30. Pulse wave measuring area 55 first uses pulse wave signal conversion area 551 of control area 5 to amplify the signal input from pulse wave detection sensor unit 30 via cable 20, and then converts this signal to a digital signal and outputs it to pulse wave signal storage area 552 of RAM4. The pulse wave data temporarily stored in pulse wave signal storage area 552 is read by pulse wave signal computation area 553 of control area 5 and fast Fourier transformation (FFT processing) is applied to this data for frequency analysis. The result of this analysis is input into pulse wave component extraction area 554, and this pulse wave component extraction area 554 then extracts pulse wave components from the signal input from pulse wave signal computation area 553 and outputs the result to pulse count computation area 555. This pulse count computation area 555 can then compute a pulse count from the frequency component of the pulse wave that was input and output the result to liquid crystal display device 13.

Operation of the Portable Electronic Instrument

As explained above, portable electronic instrument 1 in this embodiment is provided with a clock function, a pulse wave measurement function as well as a pitch measurement function; and can be switched among the clock mode, the stopwatch mode, the pulse-counting mode in which both time and pulse wave information can be measured, as well as the pitch-measurement mode. Each mode of portable electronic instrument 1 of this embodiment is explained below.

Figure 10:
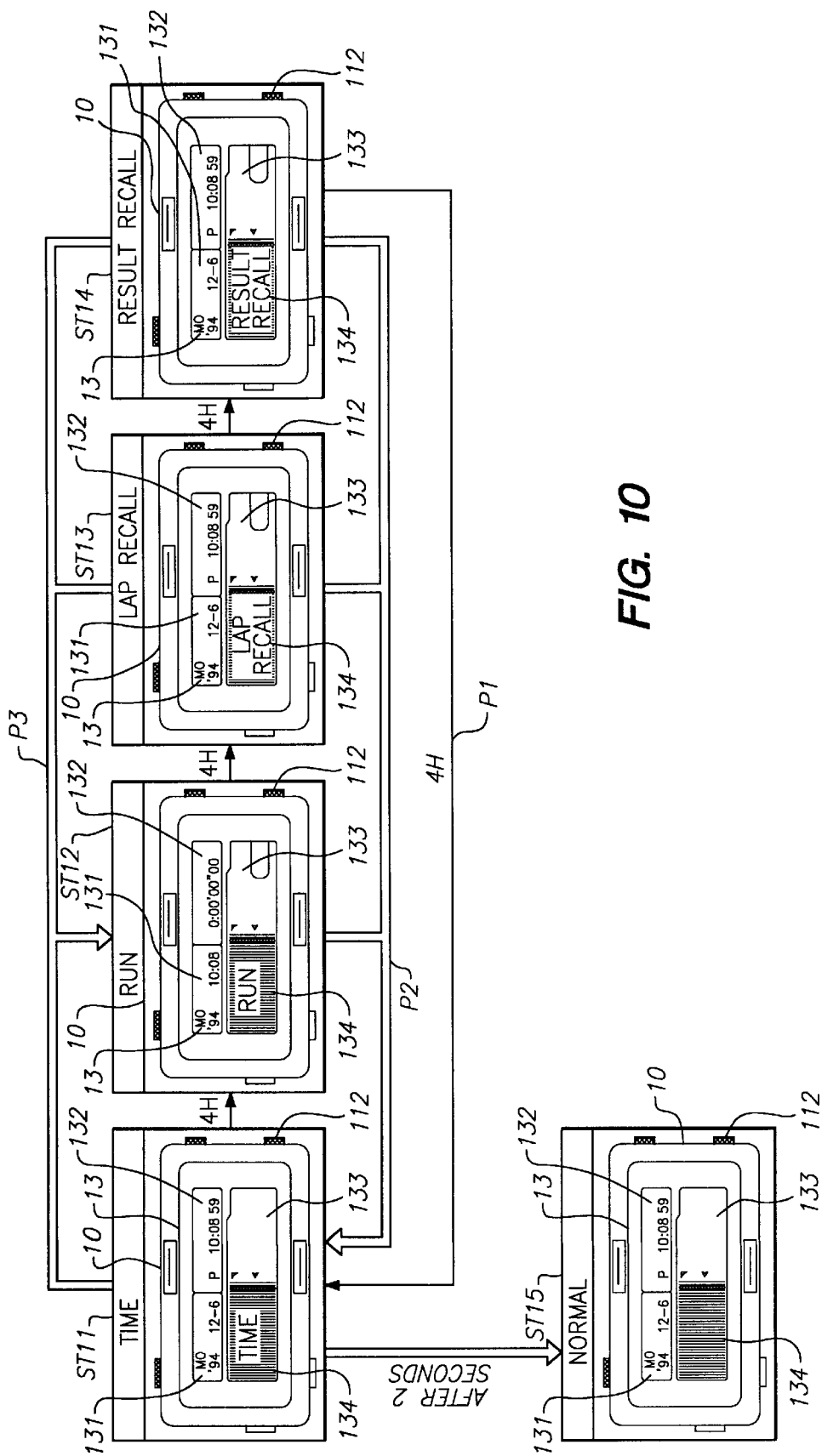
FIG. 10 is a diagram showing the various modes of the portable electronic instrument shown in FIG. 1.

FIG. 10 schematically shows the various modes available in portable electronic instrument 1 and the corresponding display contents of liquid crystal display device 13. Step ST11 shows the clock mode, and first segment display area 131 shows Monday, Dec. 6, 1994 and second segment display area 132 shows the current time of 10:08:59 pm. Dot display area 134 shows "TIME" which indicates that the current mode is the clock mode. "TIME" will be displayed in dot display area 134 only for a few seconds immediately following the selection of the clock mode. Note that nothing is displayed in third segment display area 133.

If button switch 111 located in the 2 o'clock direction is pressed during the clock mode, portable electronic instrument 1 in this embodiment can generate an alarm sound after one hour, for example; and any time can be set for this alarm generation time. If button switch 113 located in the 11 o'clock direction is pressed, the EL backlight of liquid crystal display device 13 is lit for 3 seconds and then automatically turns itself off.

If button switch 112 located in the 4 o'clock direction is pressed from this mode, the instrument switches to the running mode (step ST12). This mode is for using portable electronic instrument 1 as a stopwatch. In the running mode, the current time is displayed in first segment display area 131 before measurement is started (i.e., in the standby state), and [0:00':00":00] is displayed in second segment display area 132. Dot display area 134 shows "RUN" which indicates the running mode for only 2 seconds and then the graphics change.

If button switch 112 located in the 4 o'clock direction is pressed from this mode, the instrument switches to the lap time recall mode (step ST1L3). This mode is for recalling lap times and split times measured in the past using portable electronic instrument 1. In the lap time recall mode, first segment display area 131 shows the date and second segment display area 132 shows the current time. Dot display area 134 shows "LAP/RECALL" which indicates the recall mode for only 2 seconds, and then the trend of pulse counts for the most recent lap will be displayed.

If button switch 112 located in the 4 o'clock direction is pressed from this mode, the instrument switches to the pulse wave measurement result recall mode (step ST14). This mode is for recalling the change in pulse count over time measured using portable electronic instrument 1 and stored during an event such as a marathon in the past, and the change in pitch over time measured in the past using portable electronic instrument 1. In this recall mode, first segment display area 131 shows the date and second segment display area 132 shows the current time. Dot display area 134 shows "RESULT/RECALL" for only 2 seconds, and then a graph showing the change in the average pulse count over time will be displayed.

If button switch 112 located in the 4 o'clock direction is pressed again from this mode, the instrument returns to the clock mode (step ST11) as indicated by arrow P1. If nothing is entered in steps ST12 through ST14 for 10 minutes, the instrument also automatically returns to the clock mode (step ST11) as indicated by arrow P2. When the instrument returns to the clock mode, first segment display area 131 shows the date and second segment display area 132 shows the current time.

Figure 11A:
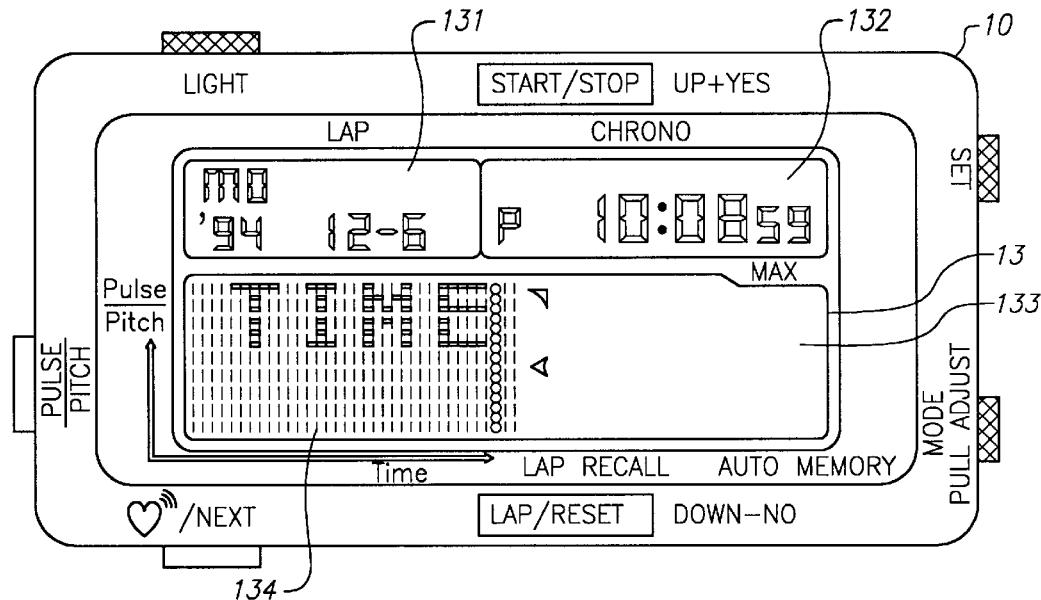
FIG. 11(a) is a diagram showing the indicator display when the clock mode is selected.
Figure 11B:
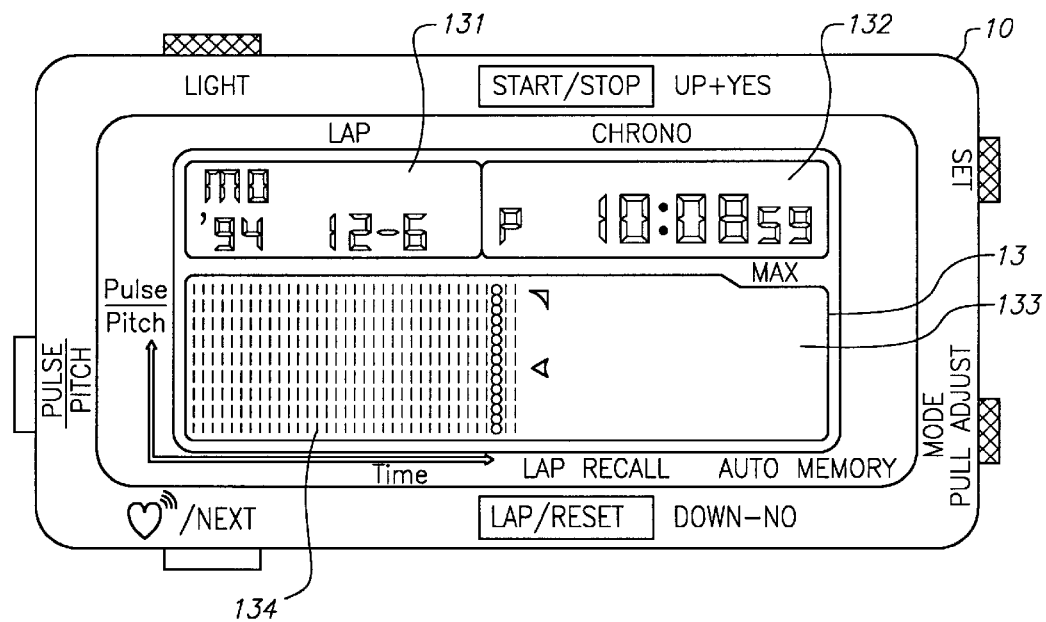
FIG. 11(b) is a diagram showing the state in which this indicator display has been turned off.

When portable electronic instrument 1 in this embodiment goes into the clock mode, dot display area 134 shows "TIME" indicating a return to the clock mode, as shown magnified in FIG. 11(a). However, this display automatically goes off after 2 seconds as shown in FIG. 11(b) and the normal state of the clock mode returns (step ST15). In this normal clock mode state, dot display area 134 does not show anything. That is, electrical power consumption is reduced by turning on the dot display for the minimum amount of time long enough to inform the user of the mode, and by using the fact that the dot display is not lit to indicate the normal state of the clock mode.

When connector piece 80 is installed in connector area 70 of portable electronic instrument 1 of this embodiment in any of the states described above, the instrument automatically switches to the running mode (step ST12) as indicated by arrow P3 in FIG. 10. In this running mode, the instrument can function as a stopwatch and can also measure the pitch and pulse count during running.

How the function as a pitch counter and the function as a pulse counter are used in the running mode will be explained with references mostly to FIG. 12.

Figure 12:
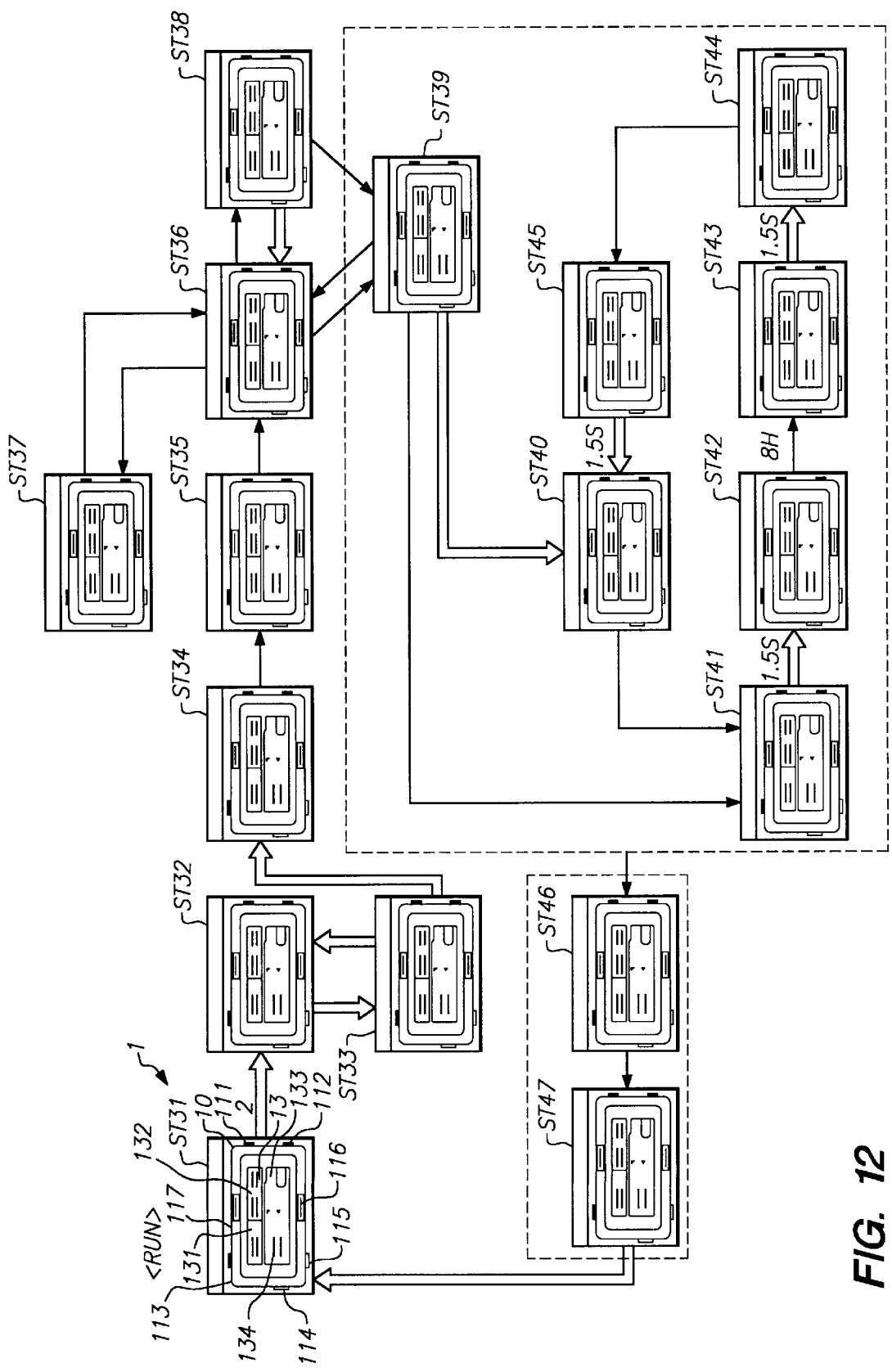
FIG. 12 is a diagram for explaining the functions in the running mode of the portable electronic instrument shown in FIG. 1 when the instrument is a pitch and pulse counter.
Figure 13A:
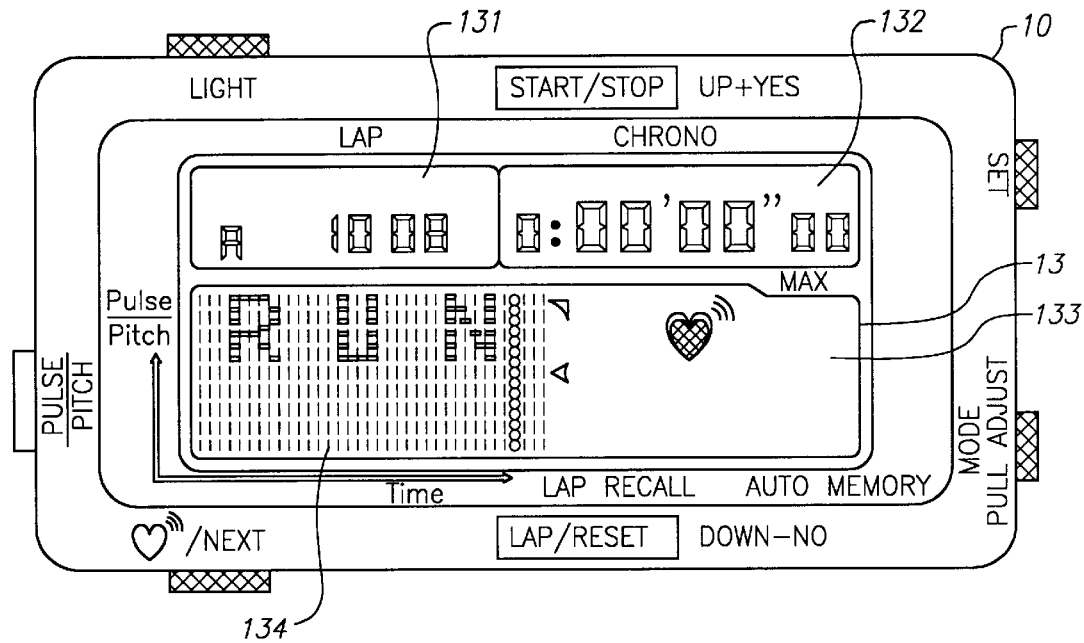
FIG. 13(a) is a diagram for explaining the content of the display when the pitch and pulse counter is switched to the running mode.

First, in FIG. 12, when the instrument switches to the running mode which provides the pitch counter and pulse counter functions (step ST31), the current time is displayed in first segment display area 131 of the liquid crystal display device, [0:00':00":00] is displayed in second segment display area 132, and dot display area 134 shows "RUN", as shown in FIG. 13(a). A heart symbol also flashes in third segment display area 133, indicating that the instrument has been switched to the running mode which can provide the pitch counter and pulse counter functions.

When this mode switching occurs, electrical power is supplied to pulse wave measuring area 55, etc., and the initialization process such as setting of an operating frequency is carried out. Then, after 2 seconds, a pulse wave signal for measuring the initial pulse count is fetched. During this process, dot display area 134 alternates between the display of "STOP/5" (step ST32) and the display of "MOTION/4" (step ST33) at a 2 Hz frequency, and also shows a display that tells the user to hold still for 5 seconds. Note that the number displayed then changes by counting down 5 seconds. Then, the instrument stays in the standby state until button switch 117 located on the top side of surface of device main body 10 is pressed to begin time measurement (step ST34).

Figure 13B:
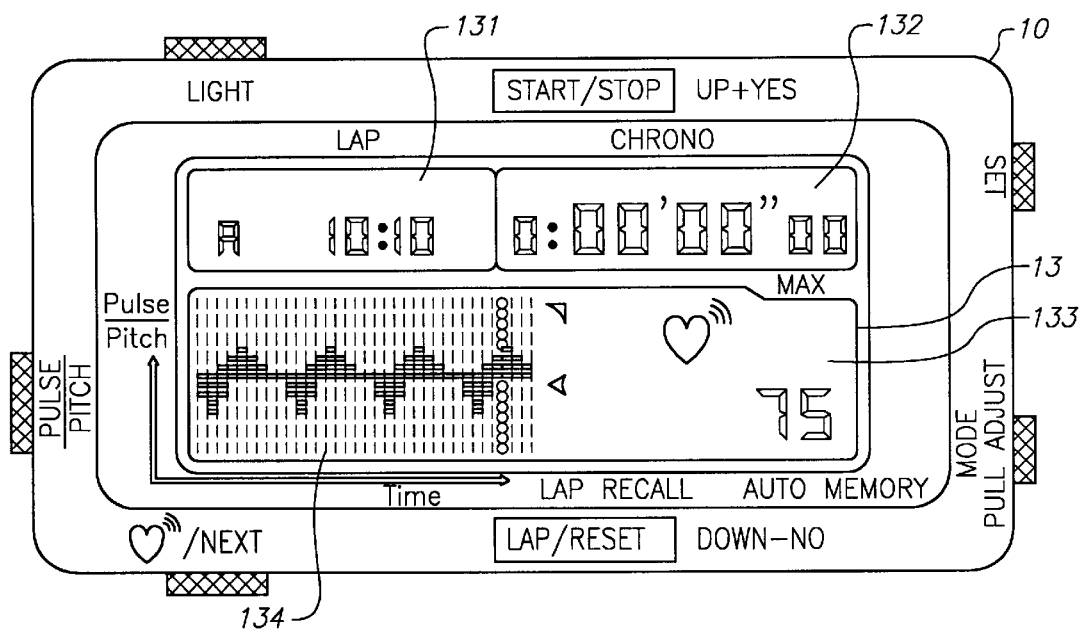
FIG. 13(b) is a diagram for explaining the display state before pulse count measurement begins.

In this standby state, dot display area 134 graphically displays the source waveform of a pulse wave signal as shown in FIG. 13(b). The source waveform displayed here is the latest data. Therefore, by checking the shape and level of the source waveform of the pulse wave signal before beginning time measurement (a marathon), it is possible to determine whether or not LED 31 and phototransistor 32 are correctly mounted. Also, by adjusting LED 31 and phototransistor 32 while checking the shape and level of the source waveform, it is possible to position LED 31 and phototransistor 32 in the optimum locations. Additionally, it is possible to check whether or not the ambient temperature and humidity in the environment are suitable to measurements beforehand. Furthermore, these functions can be used for testing portable electronic instrument 1 during its manufacture. Moreover, since the source waveform is graphically displayed, it is possible to check whether or not the time axis has been shifted due to a cause such as a weak battery. Note that third segment display area 133 displays the initial pulse count of "75" which is determined from pulse conversion.

From this state, when a marathon is started and at the same time button switch 117 located on the top side of the surface of device main body 10 is pressed, the measurement of the elapsed time begins and at the same time pitches and pulse counts are measured (step ST35).

Figure 14A:
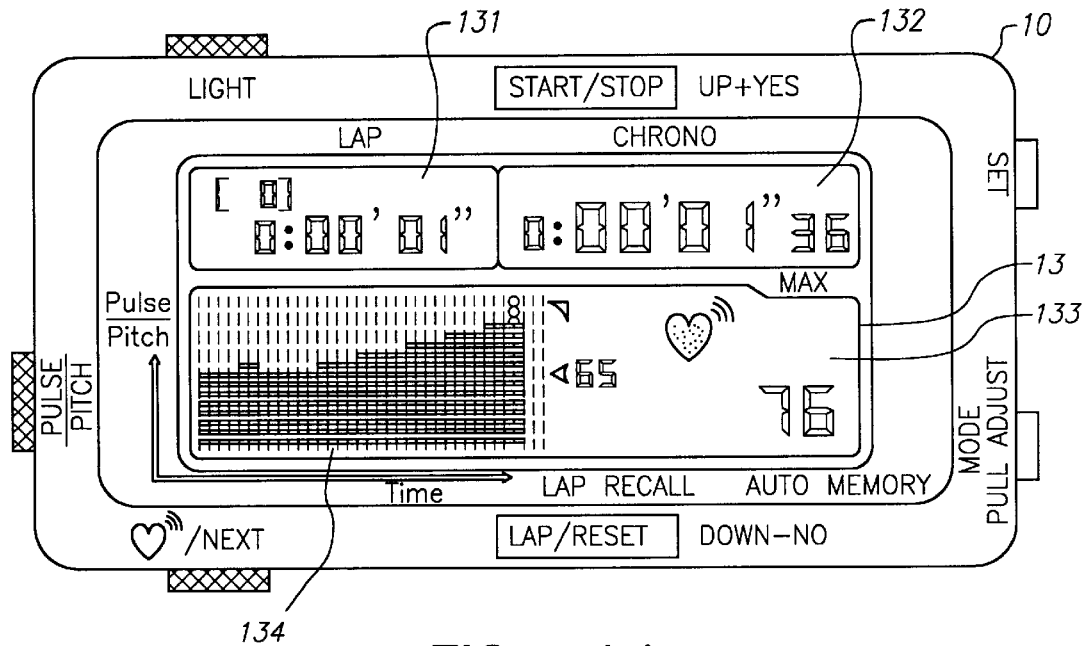
FIG. 14(a) is a diagram for explaining the content of the display after pulse count measurement begins in the running mode but before the pulse count reaches the specified range, when the instrument is a pitch and pulse counter.

These measurement results are displayed as shown in FIG. 14(a). That is, the elapsed time is displayed in second segment display area 132 and the change in the pulse count over time is graphically displayed in dot display area 134. This graphical display uses a bar graph that extends from the bottom toward the top, with the approximate mid point of the vertical axis set to a pulse count of 65. During this process, third segment display area 133 shows the scale for the vertical axis for the graph displayed in dot display area 134, as well as the current pulse count.

Figure 14B:
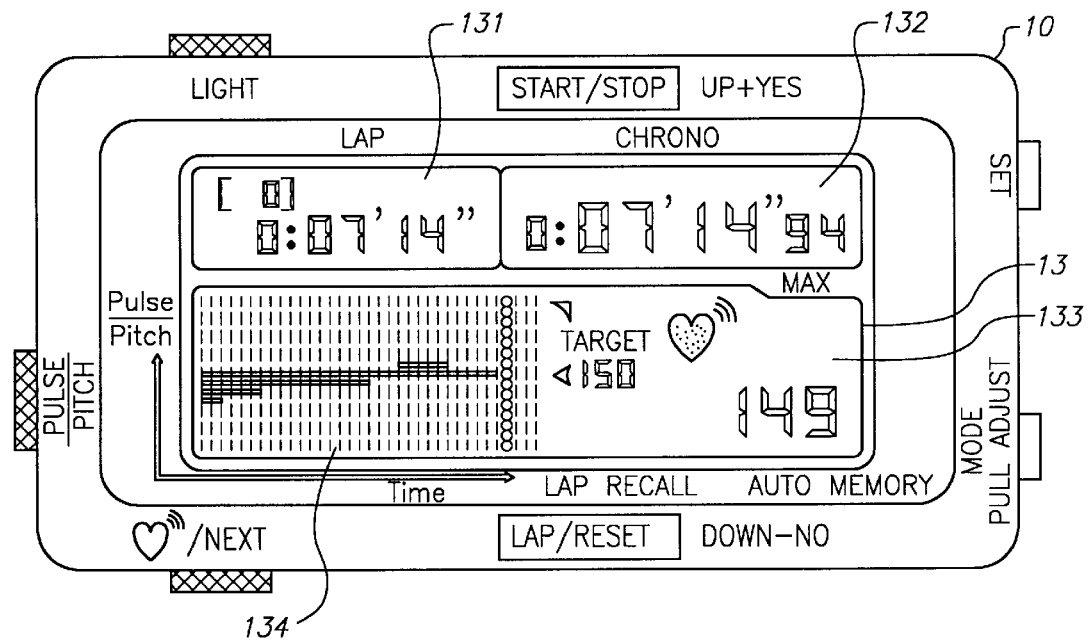
FIG. 14(b) is a diagram for explaining the content of the display after the pulse count reaches the specified range.

From this state, when the pulse count enters the range (the specified range between pulse counts of 120 and 168), the pulse count is graphically displayed as the difference from the preset reference pulse count (step ST36) as shown in FIG. 14(b). In this graphical display, the approximate mid point of the vertical axis is set to a pulse count of 150, for example, and the difference between this value and the actual pulse count is shown as a bar graph that extends up or down (in the positive or negative direction). Additionally, a mark indicating the specified pulse count range will be displayed at the right edge of dot display area 134.

Figure 14C:
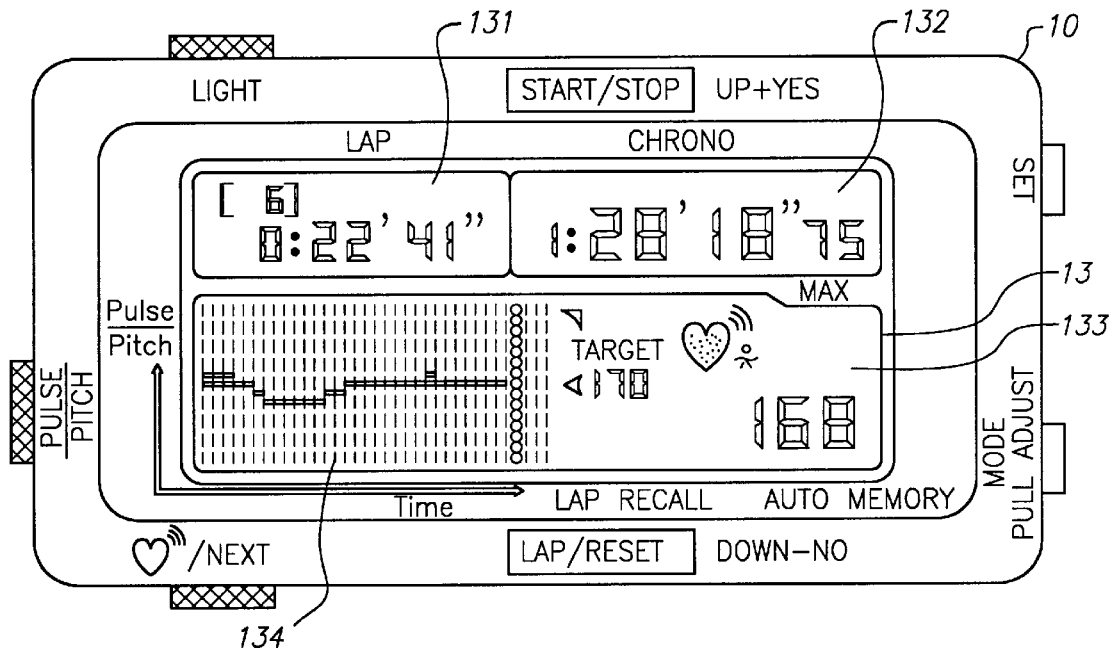
FIG. 14(c) is a diagram for explaining the display state for showing the changes in the pitch over time.

In this state, if button switch 114 located in the 8 o'clock direction is pressed, dot display area 134 will graphically display the change in pitch over time (step ST37). This graphical display uses a polygonal line graph, with the approximate mid point of the vertical axis set to a pitch of 170 (times/minute), for example, as shown in FIG. 14(c). During this process, third segment display area 133 shows the scale (indicating that the approximate mid point of the vertical axis is 170) for the vertical axis for the graph displayed in dot display area 134, as well as the current pitch. As explained above, because portable electronic instrument 1 in this embodiment shows the change in pitch over time in dot display area 134 using a format, such as a polygonal line graph, different from that used for the pulse count display, the runner can easily recognize which information is currently being displayed by simply looking at the display format. Portable electronic instrument 1 of this embodiment does not have a switch for selecting a run or walk because it is designed to display an accurate pitch in either state.

From this state, if button switch 114 located in the 8 o'clock direction is pressed again, the instrument returns to the state in which dot display area 134 displays the change in pulse count over time (step ST36).

If the user presses button switch 116 located on the bottom side of the surface of device main body 10 when passing a designated point, the current lap time will be displayed in first segment display area 131 (step ST38). Then, after 10 seconds, the instrument automatically returns to step ST36.

Afterwards, if the user presses button switch 117 located on the top side of the surface of device main body 10 simultaneously when reaching the goal, measurement of pulse count, pitch, and time stops, and "COOLING/DOWN" will be displayed in dot display area 134 (step ST39). Then, after 2 minutes have passed in this state, dot display area 134 will graphically display the change in pulse count over time after the goal-in as the pulse recovery characteristic (step ST40).

Figure 15A:
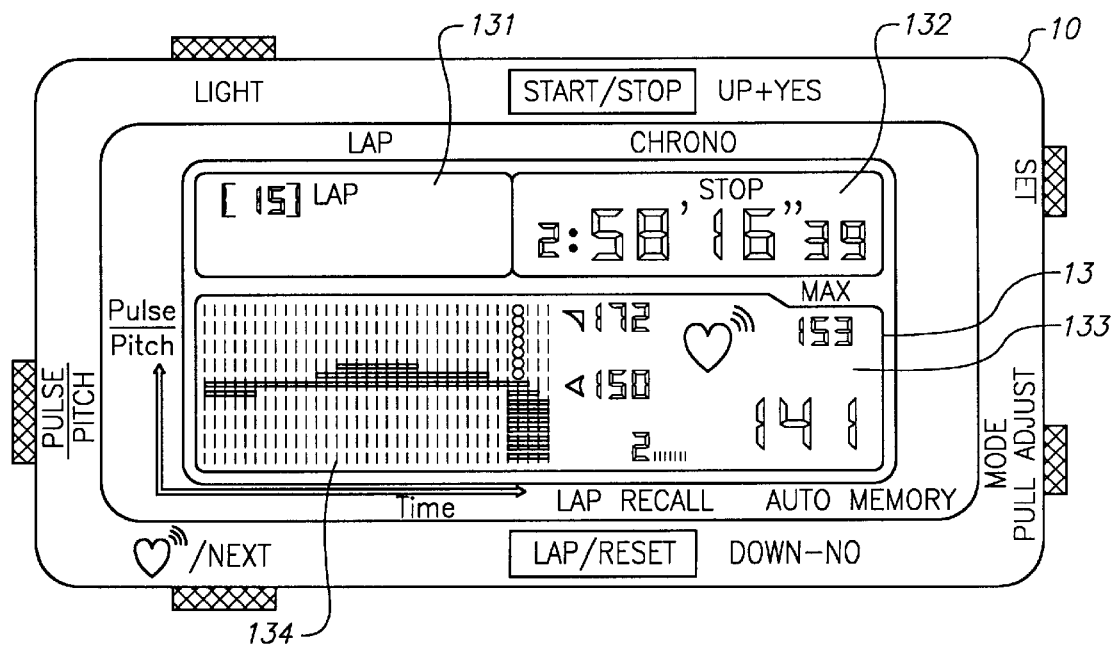
FIG. 15(a) is a diagram for explaining the content of the display after an instruction for stopping pulse counting is received by the portable electronic instrument shown in FIG. 1 and the pulse count is within the specified range.
Figure 15B:
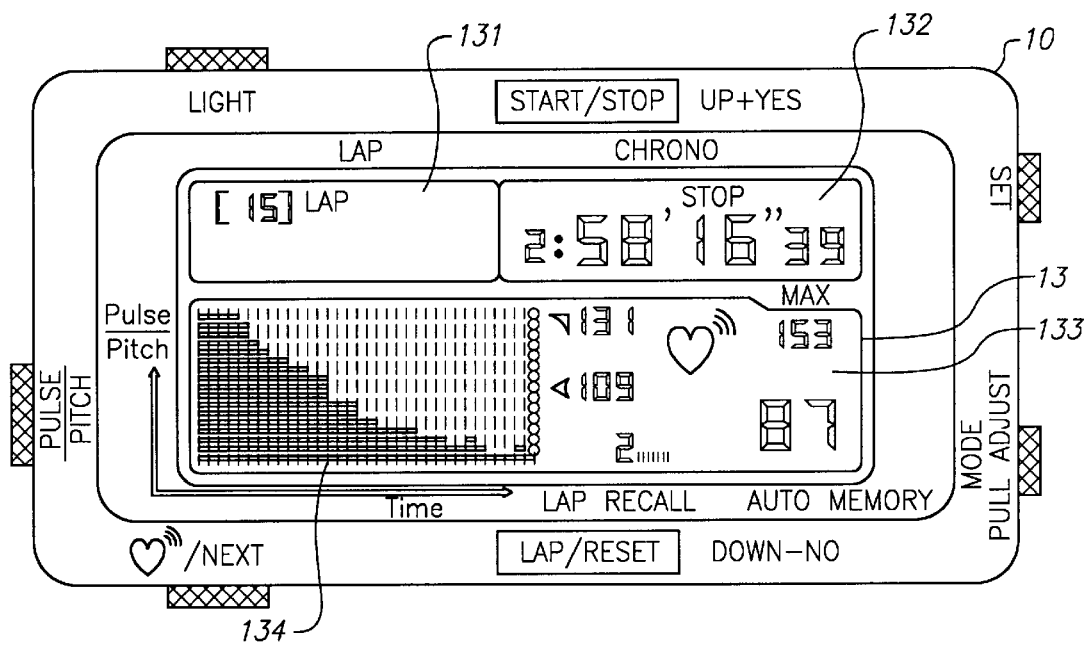
FIG. 15(b) is a diagram for explaining the content of the display when the pulse count goes outside the specified range.
Figure 16A:
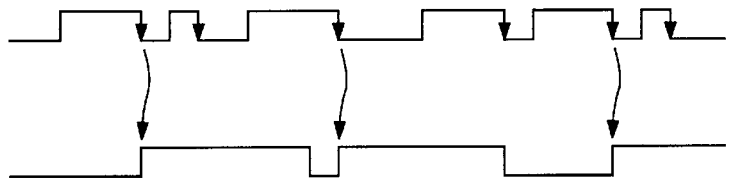
FIG. 16(a) is a waveform diagram in a conventional pitch counter after a body movement signal obtained during running is converted to pulses.
Figure 16B:
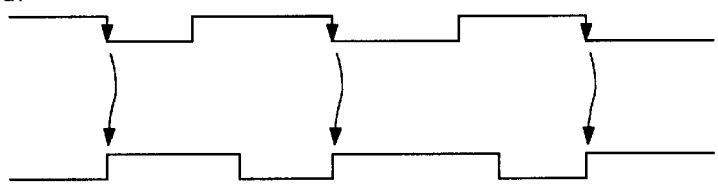
FIG. 16(b) is a waveform diagram in a conventional pitch counter after a body movement signal obtained during walking is converted to pulses.

For this pulse recovery characteristic, the graphical display switches to a bar graph that extends from the bottom toward the top, with the same scale that has a pulse count of 150 as the approximate mid point of the vertical axis, as shown in FIG. 15(a). Then, as shown in FIG. 15(b), the recovery characteristic is measured for 2 minutes. During this process, third segment display area 133 shows the scale for the vertical axis for the graph displayed in dot display area 134, as well as the current pulse count.

From this state, if button switch 114 located in the 8 o'clock direction is pressed, dot display area 134 displays "PULSE/RESULT" for 1.5 seconds (step ST41), and then displays the change in pulse count over time for the most recent marathon (step ST42). If button switch 114 located in the 8 o'clock direction is pressed again, dot display area 134 displays "PITCH/RESULT" for 1.5 seconds (step ST43), and then displays the change in pitch over time for the most recent marathon (step ST44). If button switch 114 located in the 8 o'clock direction is pressed yet again, dot display area 134 displays "COOLING/DOWN" for 1.5 seconds (step ST45), and then returns to the state (step ST40) in which the change in pulse count over time after the goal-in is displayed as the pulse recovery characteristic.

Note that if button switch 116 located on the bottom side of the surface of device main body 10 is pressed after the goal-in, dot display area 134 displays "PROTECT/MEMORY?" asking whether or not the current result should be saved (step ST46); and if "YES" response is given by pressing button switch 117 located on the top side of the surface of device main body 10, dot display area 134 displays "MEMORY" indicating that the result is being saved (step ST47), and returns to the initial state (step ST31) after 2 seconds.

If button switch 112 located in the 4 o'clock direction is pressed after measurements as a pitch counter and a pulse counter are finished, the instrument switches to the lap time recall mode (step ST13) as shown in FIG. 10. From this mode, if button switch 112 located in the 4 o'clock direction is pressed, the instrument switches to the pulse wave measurement result recall mode (step ST14). This mode can also graphically display the changes in pitch and pulse count over time in dot display area 134. From this state, if button switch 112 located in the 4 o'clock direction is pressed, the instrument returns to the clock mode (step ST11).

When the instrument returns to the clock mode, first segment display area 131 again shows the date and second segment display area 132 shows the current time. Dot display area 134 shows "TIME" indicating a return to the clock mode, but this display automatically disappears after 2 seconds as indicated by arrow P4 and the normal state of the clock mode returns (step ST15).

As explained above, the portable electronic instrument of this embodiment is a device equipped with various types of displays and measurement functions, and can display various information such as lap, pulse, and pitch while the user is engaged in an activity such as a marathon. In this multi-function portable electronic instrument, pitch measurement can be made with the operation of a single button, and furthermore no conditional setting such as for running or walking is required at all. Therefore, the user can display a pitch immediately when he/she wants to, and can instantly obtain a highly accurate pitch because no conditional setting such as for running or walking is required. Moreover, because the operation for measuring or displaying a pitch is simple, the pitch measurement operation is not cumbersome, enabling the user to easily determine the condition of his/her body, as well as the state of the run or walk by displaying the pitch anytime.

As explained above, the third harmonic appears during walking and the second harmonic appears during running, as a high-level signal in the frequency range that is at or above the first frequency setting, e.g., 100 times/minute, when the frequency of a body movement signal is analyzed. By utilizing this difference, the pitch measurement device, the electronic instrument, and the pitch measurement method according to the invention can automatically and accurately calculate pitch in either state. Therefore, the invention can accurately and quickly provide pitch both during running and walking, and can simply provide highly accurate pitches because it does not require any external operations for switching modes between running and walking or any analysis mode changes.

Furthermore, whether the reference wave for which a pitch is to be determined is the second or third harmonic can be determined based on whether or not a high-level signal is present near a frequency that is $1/3$ or $2/3$ of the reference wave frequency, for example. Even when a high-level signal is present near a frequency that is $1/3$ or $2/3$ of the reference wave frequency, a configuration can be used that determines that the reference wave is the third harmonic only if the reference wave frequency is equal to or higher than the specified frequency level (the second frequency setting). The use of a measurement device and a measurement method capable of such double-checking can prevent noise from causing errors during the determination of whether the reference wave is the second or third harmonic, thus further increasing the accuracy of the pitch calculated.

Moreover, because adopting the pitch measurement device or the pitch measurement method according to the invention can easily provide pitch both during running and walking, they are suitable for incorporating a pitch measurement function in a multi-function electronic instrument such as that explained above, and accurate pitches can be obtained using simple operations even when various functions are being used.

Industrial Application Potential

The present invention relates to a pitch measurement device and a pitch measurement method that measure pitch both during running and walking, and the invention makes it possible to calculate pitch without differentiating between running and walking. Therefore, a multi-function electronic instrument that includes a pitch measurement function can provide accurate pitches using simple operations and can prevent measurement errors.

What is claimed is:

1. A pitch measurement device comprising:

a body movement sensor for detecting body movement;

a frequency analysis means for analyzing frequency of body movement detected by said body movement sensor;

a pitch calculation means for calculating pitch during at least one of body running movement and body walking movement from an analysis result of said frequency analysis means;

said pitch calculation means comprising means for identifying a reference wave for calculating pitch, said means for identifying a reference wave comprising means for identifying from said analysis result a signal having an intensity level at least equal to a predetermined level and a frequency at least equal to a predetermined frequency;

said pitch calculation means comprising means for determining that said reference wave is at least one of a second and a third harmonic of body movement detected by said body movement sensor; and wherein said pitch calculation means comprises a harmonic confirmation means for determining if said analysis result includes a high-level signal near at least one of a frequency from the group including $1/3$ or $2/3$ of the frequency of said reference wave, and wherein said determining means determines said reference wave to be said second harmonic if no high-level signal is present near at least one of a frequency from the group including $1/3$ and $2/3$ of the frequency of said reference wave.

2. A pitch measurement device according to claim 1 wherein said harmonic confirmation means comprises a wave confirmation means for determining if said analysis result includes a high-level signal near a frequency that is ⅓ of the frequency of said reference wave, and wherein said determining means determines said reference wave to be said second harmonic if no high-level signal is present near a frequency that is ⅓ of the frequency of the reference wave.

3. A pitch measurement device according to claim 1 wherein said harmonic confirmation means comprises a wave confirmation means for determining if said analysis result includes a high-level signal near a frequency that is ⅔ of the frequency of said reference wave, and wherein said determining means determines said reference wave to be said second harmonic if no high-level signal is present near a frequency that is ⅔ of the frequency of the reference wave.

4. A pitch measurement device comprising:

a body movement sensor for detecting body movement;

a frequency analysis means for analyzing frequency of body movement detected by said body movement sensor;

a pitch calculation means for calculating pitch during at least one of body running movement and body walking movement from an analysis result of said frequency analysis means;

said pitch calculation means comprising means for identifying a reference wave for calculating pitch, said means for identifying a reference wave comprising means for identifying from said analysis result a signal having an intensity level at least equal to a predetermined level and a frequency at least equal to a predetermined frequency;

said pitch calculation means comprising means for determining that said reference wave is at least one of a second and a third harmonic of body movement detected by said body movement sensor; and wherein said pitch calculation means comprises means for outputting the frequency of said reference wave as the calculated pitch if said reference wave is determined to be said second harmonic, and for outputting ⅔ of the frequency of said reference wave as the calculated pitch if said reference wave is determined to be said third harmonic.

5. A pitch measurement device comprising:

a body movement sensor for detecting body movement;

a frequency analysis means for analyzing frequency of body movement detected by said body movement sensor;

a pitch calculation means for calculating pitch during at least one of body running movement and body walking movement from an analysis result of said frequency analysis means;

said pitch calculation means comprising means for identifying a reference wave for calculating pitch, said means for identifying a reference wave comprising means for identifying from said analysis result a signal having an intensity level at least equal to a predetermined level and a frequency at least equal to a predetermined frequency;

said pitch calculation means comprising means for determining that said reference wave is at least one of a second and a third harmonic of body movement detected by said body movement sensor; and wherein said determining means includes a first wave confirmation means for determining if said analysis result includes a high-level signal near a frequency that is ⅓ of the frequency of said reference wave, and a second wave confirmation means for determining if said analysis result includes high-level signal near a frequency that is ⅔ of said reference wave, and wherein:

said determining means determines said reference wave to be said second harmonic if no high-level signal is present near a frequency that is ⅓ of the frequency of said reference wave and if no high-level signal is present near a frequency that is ⅔ of the frequency of said reference wave.

6. A pitch measurement device according to claim 5 wherein said determining means includes means for comparing the frequency of said reference wave to a second predetermined frequency and for determining said reference wave to be said second harmonic if said analysis result includes a high-level signal near at least one of a frequency from the group including ⅓ and ⅔ of said reference wave frequency, and if said reference wave frequency is less than said second predetermined frequency, and means for determining said reference wave to be said third harmonic if said analysis result includes if a high-level signal near at least one of a frequency from the group including ⅓ and ⅔ of said reference wave frequency, and if said reference wave frequency is at least equal to said second predetermined frequency.

7. A pitch measurement device comprising:

a body movement sensor for detecting body movement;

a frequency analysis means for analyzing frequency of body movement detected by said body movement sensor;

a pitch calculation means for calculating pitch during at least one of body running movement and body walking movement from an analysis result of said frequency analysis means;

said pitch calculation means comprising means for identifying a reference wave for calculating pitch, said means for identifying a reference wave comprising means for identifying from said analysis result a signal having an intensity level at least equal to a predetermined level and a frequency at least equal to a predetermined frequency;

said pitch calculation means comprising means for determining that said reference wave is at least one of a second and a third harmonic of body movement detected by said body movement sensor; and wherein said determining means includes means for comparing the frequency of said reference wave to a second predetermined frequency and for determining said reference wave to be said second harmonic if said reference wave frequency is less than said second predetermined frequency.

8. An electronic instrument comprising a body movement sensor for detecting body movement;

a control device for processing signals from said sensor;

a display device for displaying an output from said control device; and wherein said control device comprises a frequency analysis unit for analyzing frequency of body movement detected by said sensor and a pitch calculation unit for calculating pitch during at least one of body running movement and body walking movement from an analysis result of said frequency analysis unit; and wherein said pitch calculation unit comprising means for identifying a reference wave for calculating pitch, said means for identifying a reference wave comprising means for identifying from said analysis result a signal having an intensity level at least equal to a predetermined level and a frequency at least equal to a predetermined frequency; and said pitch calculation unit comprising means for determining that said reference wave is at least one of second and a third harmonic of body movement detected by said body movement sensor and for outputting a result of said determination to said output device; and wherein said pitch calculation unit comprises means for outputting the frequency of said reference wave as the calculated pitch if said reference wave is determined to be said second harmonic, and for outputting ⅔ of the frequency of said reference wave as the calculated pitch if said reference wave is determined to be said third harmonic.

9. A pitch measurement method comprising:

analyzing frequency of body movement;

calculating pitch during at least one of body running movement and body walking movement from an analysis result of said frequency analysis step;

said pitch calculation step comprising identifying a reference wave for calculating pitch, said identifying a reference wave step comprising identifying from said analysis result a signal having an intensity level at least equal to a predetermined level and a frequency at least equal to a predetermined frequency;

said pitch calculation step comprising determining that said reference wave is at least one of a second and a third harmonic of body movement; and wherein said pitch calculation step comprises outputting the frequency of said reference wave as the calculated pitch if said reference wave is determined to be said second harmonic, and outputting ⅔ of the frequency of said reference wave as the calculated pitch if said reference wave is determined to be said third harmonic.

10. A pitch measurement method comprising:

analyzing frequency of body movement;

calculating pitch during at least one of body running movement and body walking movement from an analysis result of said frequency analysis step;

said pitch calculation step comprising identifying a reference wave for calculating pitch, said identifying a reference wave step comprising identifying from said analysis result a signal having an intensity level at least equal to a predetermined level and a frequency at least equal to a predetermined frequency;

said pitch calculation step comprising determining that said reference wave is at least one of a second and a third harmonic of body movement; and wherein said pitch calculation step comprises a harmonic confirmation step for deciding if said analysis result includes a high-level signal near at least one of a frequency from the group including ⅓ and ⅔ of the frequency of said reference wave, and wherein said determining step determines said reference wave to be said second harmonic if no high-level signal is present near at least one of a frequency from the group including ⅓ and ⅔ of the frequency of said reference wave.

11. A pitch measurement method according to claim 10 wherein said harmonic confirmation step comprises a wave confirmation step for deciding if said analysis result includes a high-level signal near a frequency that is ⅓ of the frequency of said reference wave, and wherein said determining step determines said reference wave to be said second harmonic if no high-level signal is present near a frequency that is ⅓ of the frequency of the reference wave.

12. A pitch measurement step according to claim 10 wherein said harmonic confirmation step comprises a wave confirmation step for deciding if said analysis result includes a high-level signal near a frequency that is ⅔ of the frequency of said reference wave, and wherein said determining step determines said reference wave to be said second harmonic if no high-level signal is present near a frequency that is ⅔ of the frequency of the reference wave.

13. A pitch measurement method comprising:

analyzing frequency of body movement;

calculating pitch during at least one of body running movement and body walking movement from an analysis result of said frequency analysis step;

said pitch calculation step comprising identifying a reference wave for calculating pitch, said identifying a reference wave step comprising identifying from said analysis result a signal having an intensity level at least equal to a predetermined level and a frequency at least equal to a predetermined frequency;

said pitch calculation step comprising determining that said reference wave is at least one of a second and a third harmonic of body movement; and wherein said determining step includes a first wave confirmation step for deciding if said analysis result includes a high-level signal near a frequency that is ⅓ of the frequency of said reference wave, and a second wave confirmation step for deciding if said analysis result includes high-level signal near a frequency that is ⅔ of said reference wave, and wherein:

said determining step determines said reference wave to be said second harmonic if no high-level signal is present near a frequency that is ⅓ of the frequency of said reference wave and if no high-level signal is present near a frequency that is ⅔ of the frequency of said reference wave.

14. A pitch measurement method according to claim 13 wherein said determining step includes comparing the frequency of said reference wave to a second predetermined frequency and determining said reference wave to be said second harmonic if said analysis result includes a high-level signal near at least one of a frequency from the group including ⅓ and ⅔ of said reference wave frequency, and if said reference wave frequency is less than said second predetermined frequency, and determining said reference wave to be said third harmonic if said analysis result includes a high-level signal near at least one of a frequency from the group including ⅓ and ⅔ of said reference wave frequency, and if said reference wave frequency is at least equal to said second predetermined frequency.

15. A pitch measurement method comprising:

analyzing frequency of body movement;

calculating pitch during at least one of body running movement and body walking movement from an analysis result of said frequency analysis step;

said pitch calculation step comprising identifying a reference wave for calculating pitch, said identifying a reference wave step comprising identifying from said analysis result a signal having an intensity level at least equal to a predetermined level and a frequency at least equal to a predetermined frequency;

said pitch calculation step comprising determining that said reference wave is at least one of a second and a third harmonic of body movement; and wherein said determining step includes comparing the frequency of said reference wave to a second predetermined frequency and for determining said reference wave to be said second harmonic if said reference wave frequency is less than said second predetermined frequency.

16. A medium readable by a machine embodying a program of instructions executable by said machine to perform a pitch measurement method, said pitch measurement method comprising the steps of:

analyzing frequency of body movement;

calculating pitch during at least one of body running movement and body walking movement from an analysis result of said frequency analysis step;

said pitch calculation step comprising identifying a reference wave for calculating pitch, said identifying a reference wave step comprising identifying from said analysis result a signal having an intensity level at least equal to a predetermined level and a frequency at least equal to a predetermined frequency; and said pitch calculation step comprising determining that said reference wave is at least one of a second and a third harmonic of body movement; and wherein said pitch calculation step comprises outputting the frequency of said reference wave as the calculated pitch if said reference wave is determined to be said second harmonic, and outputting $2/3$ of the frequency of said reference wave as the calculated pitch if said reference wave is determined to be said third harmonic.

17. A medium readable by a machine embodying a program of instructions executable by said machine to perform a pitch measurement method, said pitch measurement method comprising the steps of:

analyzing frequency of body movement;

calculating pitch during at least one of body running movement and body walking movement from an analysis result of said frequency analysis step;

said pitch calculation step comprising identifying a reference wave for calculating pitch, said identifying a reference wave step comprising identifying from said analysis result a signal having an intensity level at least equal to a predetermined level and a frequency at least equal to a predetermined frequency; and said pitch calculation step comprising determining that said reference wave is at least one of a second and a third harmonic of body movement; and wherein said pitch calculation step comprises a harmonic confirmation step for deciding if said analysis result includes a high-level signal near at least one of a frequency from the group including $1/3$ and $2/3$ of the frequency of said reference wave, and wherein said determining step determines said reference wave to be said second harmonic if no high-level signal is present near at least one of a frequency from the group including $1/3$ and $2/3$ of the frequency of said reference wave.

18. A medium readable by a machine embodying a program of instructions executable by said machine to perform a pitch measurement method, said pitch measurement method comprising the steps of:

analyzing frequency of body movement;

calculating pitch during at least one of body running movement and body walking movement from an analysis result of said frequency analysis step;

said pitch calculation step comprising identifying a reference wave for calculating pitch, said identifying a reference wave step comprising identifying from said analysis result a signal having an intensity level at least equal to a predetermined level and a frequency at least equal to a predetermined frequency; and said pitch calculation step comprising determining that said reference wave is at least one of a second and a third harmonic of body movement; and wherein said determining step includes a first wave confirmation step for determining if said analysis result includes a high-level signal near a frequency that is $1/3$ of the frequency of said reference wave, and a second wave confirmation step for determining if said analysis result includes high-level signal near a frequency that is $2/3$ of said reference wave, and wherein:

said determining step determines said reference wave to be said second harmonic if no high-level signal is present near a frequency that is $1/3$ of the frequency of said reference wave and if no high-level signal is present near a frequency that is $2/3$ of the frequency of said reference wave.

19. A medium readable by a machine embodying a program of instructions executable by said machine to perform a pitch measurement method, said pitch measurement method comprising the steps of:

analyzing frequency of body movement;

calculating pitch during at least one of body running movement and body walking movement from an analysis result of said frequency analysis step;

said pitch calculation step comprising identifying a reference wave for calculating pitch, said identifying a reference wave step comprising identifying from said analysis result a signal having an intensity level at least equal to a predetermined level and a frequency at least equal to a predetermined frequency; and said pitch calculation step comprising determining that said reference wave is at least one of a second and a third harmonic of body movement; and wherein said determining step includes comparing the frequency of said reference wave to a second predetermined frequency and determining said reference wave to be said second harmonic if said analysis result includes a high-level signal near at least one of a frequency from the group including $1/3$ and $2/3$ of said reference wave frequency, and if said reference wave frequency is less than said second predetermined frequency, and determining said reference wave to be said third harmonic if said analysis result includes a high-level signal near at least one of a frequency from the group including $1/3$ and $2/3$ of said reference wave frequency, and if said reference wave frequency is at least equal to said second predetermined frequency.

20. A medium readable by a machine embodying a program of instructions executable by said machine to perform a pitch measurement method, said pitch measurement method comprising the steps of:

analyzing frequency of body movement;

calculating pitch during at least one of body running movement and body walking movement from an analysis result of said frequency analysis step;

said pitch calculation step comprising identifying a reference wave for calculating pitch, said identifying a reference wave step comprising identifying from said analysis result a signal having an intensity level at least equal to a predetermined level and a frequency at least equal to a predetermined frequency; and said pitch calculation step comprising determining that said reference wave is at least one of a second and a third harmonic of body movement; and wherein said determining step includes comparing the frequency of said reference wave to a second predetermined frequency and for determining said reference wave to be said second harmonic if said reference wave frequency is less than said second predetermined frequency.

* * * * *